US012289309B2

(12) United States Patent
Hyatt

(10) Patent No.: US 12,289,309 B2
(45) Date of Patent: Apr. 29, 2025

(54) 5G-WiFi INSIDE SECURE IRIS BIOMETRICS' LOGIN

(71) Applicant: Lenworth Alexander Hyatt, Boca Raton, FL (US)

(72) Inventor: Lenworth Alexander Hyatt, Boca Raton, FL (US)

( * ) Notice: Subject to any disclaimer, the term of this patent is extended or adjusted under 35 U.S.C. 154(b) by 339 days.

(21) Appl. No.: 17/300,051

(22) Filed: Feb. 19, 2021

(65) Prior Publication Data

US 2022/0272084 A1 Aug. 25, 2022

(51) Int. Cl.
*H04W 12/06* (2021.01)
*H04L 9/40* (2022.01)
(Continued)

(52) U.S. Cl.
CPC ...... *H04L 63/0861* (2013.01); *H04L 63/0815* (2013.01); *H04W 4/025* (2013.01);
(Continued)

(58) Field of Classification Search
CPC ........... H04L 63/0815; H04L 63/0861; H04W 12/06; H04W 12/12; H04W 12/40; H04W 12/63
(Continued)

(56) References Cited

U.S. PATENT DOCUMENTS

| 2004/0019570 A1* | 1/2004 | Bolle | .................. | G06V 40/168 705/64 |
| 2007/0052672 A1* | 3/2007 | Ritter | .................. | G02B 27/017 345/156 |

(Continued)

Primary Examiner — Joel Ajayi

(57) ABSTRACT

The invention is embodiment of methods for authentication, and cybersecurity, using 5G-WiFi INSIDE SECURE IRIS BIOMETRICS' LOGIN, configured as an Automated Iris-biometrics-login Identification System (AIIS) cybersecurity software application suite, having varying cybersecure computing functionalities effectively protecting computers, ATM machines, other public-machine, smartphones, other smart-devices, cyber-securing network-computers from cyberattacks, denying unauthenticated logins, cyber-securing Convolutional Neural Network (CNN), supporting and securing Machine-to-Machine (M2M) system-architecture-evolution solution (SAES), providing Global Single-Sign-On (G-SSO) replacing multiple passwords, providing unifying identification processing, automating identifications, with machine learning generic algorithm controlled by Artificial Intelligence (AI). Wherein 5G-WiFi INSIDE SECURE IRIS BIOMETRICS' LOGIN (Automated Iris-biometrics-login Identification System (AIIS) cybersecurity software application suite) embedded within network computer and smart devices of employee(s), subscriber(s), user(s), member(s) and/or client(s), effectively cyber-securing from cyberattacks hacking, spying, phishing, spamming, and other malicious activities, whenever accessing web-browser, search-engine, middleware, and Operating-System (OS) functionalities across multi-language platforms, cyber-securing communication over free space, transmitting space-to-space, space-to-ground, and/or ground-to-space, supporting and securing universal connectivity for communication from Geostationary (GEO) satellites, and Low earth-orbiting (LEO) satellites transmitting relay signals to Satellite Ground Station (SGS) (earth-station/ground terminal) parabolic omnidirectional antenna as space-to-ground transceiver, and/or ground-to-space transceiver, also, as a point-to-point bidirectional transceiver, supporting and securing connection arrangements to subscribers, clients, and/or users, to-and-from telecommunication providers, or internet providers, via Evolved Universal Terrestrial Radio Access Network (E-UTRAN), or Universal Terrestrial Radio Access Network (UTRAN), supporting and securing Global Navigation Satellite System (GNSS) also Global System for Mobile communications (GSM) with Global Positioning System (GPS), and Global Positioning System Aided Geo (Continued)

Augmented Navigation (GAGAN), further supporting and securing Fifth Generation Core Network (5G-CN), and Fifth Generation System (5G-S).

1 Claim, 7 Drawing Sheets

(51) Int. Cl.
*H04W 4/02* (2018.01)
*H04W 12/12* (2021.01)
*H04W 12/40* (2021.01)
*H04W 12/63* (2021.01)
*G06N 3/02* (2006.01)

(52) U.S. Cl.
CPC ........... *H04W 12/06* (2013.01); *H04W 12/12* (2013.01); *H04W 12/40* (2021.01); *H04W 12/63* (2021.01); *G06N 3/02* (2013.01)

(58) Field of Classification Search
USPC ........................................................ 455/411
See application file for complete search history.

(56) References Cited

U.S. PATENT DOCUMENTS

2018/0165439 A1\* 6/2018 Corcoran .............. H04L 9/3221
2019/0311472 A1\* 10/2019 Harrup ................. G06T 7/0004

\* cited by examiner

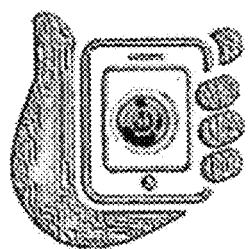
FIG 24
FIG 25
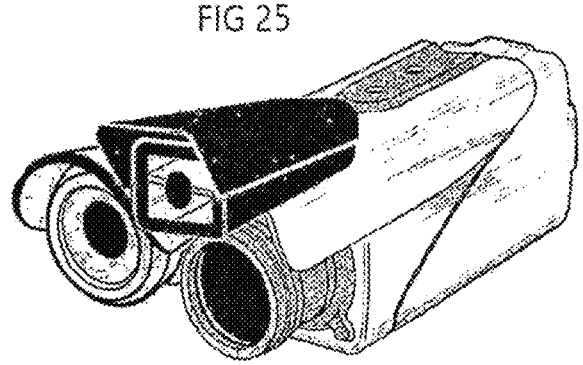

5G-WiFi INSIDE SECURE IRIS BIOMETRICS' LOGIN

CROSS-REFERENCE TO RELATED APPLICATIONS

| References Cited [Referenced By] U.S. patent Documents | | |
|---|---|---|
| 20160255074 | Sep. 1, 2016 | Fardig; Matthew William; et al. |
| 20160112402 | Apr. 21, 2016 | Schwartz; Jonathan D.; et al. |
| 20150188908 | Jul. 2, 2015 | AKELLA; Sujan; et al. |
| 20130014243 | Jan. 10, 2013 | Chen; Li Long; et al. |
| 20180053052 | Feb. 22, 2018 | Hanna; Keith J.; et al. |
| 20020024633 | Feb. 28, 2002 | Kim, Daehoon; et al. |
| 20020158750 | Oct. 31, 2002 | Almalik, Mansour Saleh |
| 20150137937 | May 21, 2015 | Smith; Robert M.; et al. |
| 20130307670 | Nov. 21, 2013 | Ramaci; Jonathan E. |
| 20150186634 | Jul. 2, 2015 | Crandell; Jeffrey L.; et al. |
| 20130111214 | May 2, 2013 | Takahashi; Kenta |
| 20110083016 | Apr. 7, 2011 | Kesanupalli; Ramesh; et al. |
| 20060204048 | Sep. 14, 2006 | Morrison; Robert A.; et al. |
| 20160132735 | May 12, 2016 | Derakhshani; Reza R.; et al. |
| 20140161325 | Jun. 12, 2014 | Bergen; James R. |
| 20150310259 | Oct. 29, 2015 | Lau; James Kai Yu; et al. |
| 20120230610 | Sep. 13, 2012 | LEE; CHUNG-I; et al. |
| 20120014568 | Jan. 19, 2012 | Conwell; William Y.; et al. |
| 20090010550 | Jan. 8, 2009 | Chang; Chih-Kuang; et al. |
| 20030005030 | Jan. 2, 2003 | Sutton, Jeffrey P.; et al. |
| 20160162802 | Jun. 9, 2016 | Chickering; David Maxwell; et al. |
| 20160189003 | Jun. 30, 2016 | LIU; MING; et al. |
| 20120158158 | Jun. 21, 2012 | Spring; Leslie |
| 20030028500 | Feb. 6, 2003 | Jameson, Kevin Wade |
| 20170236060 | Aug. 17, 2017 | IGNATYEV; OLEKSIY |
| 20160189035 | Jun. 30, 2016 | Shakeri; Cirrus; et al. |
| 20160042286 | Feb. 11, 2016 | Agarwal; Sharad; et al. |
| 20100131433 | May 27, 2010 | Sanchez Garcia; Felix; et al. |
| 20160132780 | May 12, 2016 | Aradhye; Hrishikesh; et al. |
| 20110252072 | Oct. 13, 2011 | Johnson; Jeremiah; et al. |
| 20110113068 | May 12, 2011 | Ouyang; Jie; et al. |
| 20090307164 | Dec. 10, 2009 | Baughman; Aaron K. |
| 20160140436 | May 19, 2016 | Yin; Qi; et al. |
| 20140226529 | Aug. 14, 2014 | HARRIS; SARAH; et al. |
| 20150295708 | Oct. 15, 2015 | Howe; Wayne Richard; et al. |
| 20070071197 | Mar. 29, 2007 | Ryoo; Chang Wan |
| 20110312422 | Dec. 22, 2011 | Ackley; Jonathan |
| 20130216042 | Aug. 22, 2013 | CASATI; Alessio; et al. |
| 20130064551 | Mar. 14, 2013 | HEINE; Frank; et al. |

STATEMENT REGARDING FEDERALLY SPONSORED RESEARCH OR DEVELOPMENT

"Not Applicable"

THE NAMES OF THE PARTIES TO A JOINT RESEARCH AGREEMENT

"Not Applicable"

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

"Not Applicable"

STATEMENT REGARDING PRIOR DISCLOSURES BY THE INVENTOR OR A JOINT INVENTOR

"Not Applicable"

CURRENT U.S. CLASS

726/8; 340/5.52; 340/5.82 713/186; 902/3; 382/117; 382/118; 382/305; 382/181; 706/902; 706/12; 382/155; 706/45; 706/61; 706/46; 706/47; 706/50; 706/5; 706/52; 707/804; 707/784; 706/13; 706/20; 370/255; 380/28; 379/433.09; 379/114.15; 463/41; 380/247; 398/121;

CURRENT CPC CLASS

G05B 19/00 20130101; G05B 2219/00 20130101; G05B 13/00 20190101; G06N 20/00 20190101; G06N 5/00 20190101; H04L 9/0852 20160801; H04B 10/00 20200501; G06F 11/1482 20130101; G06F 11/3013 20130101; H04L 9/00 20180501; G06F 21/00 20180501; H04L 29/06612 20130101; H04W 12/00 20190101; H04L 29/06979 20130101; H04L 29/06632 20130101; H04L 29/06857 20130101; H04L 29/06755 20130101; H04L 63/0815 20130101; G06F 21/41 20151101; G07C 9/30 20200101; G07C 2209/02 20130101; A61M 2205/702 20130101; G06F 2221/2139 20130101; H04W 12/0605 20190101; G07C 9/38 20200101; G07C 9/00 20200101; H04W 12/00401 20190101; H04M 2203/6045 20130101; G06F 3/0637 20130101; G06F 9/454 20180201; G07F 7/0826 20130101; H04W 12/00401 20190101; H04W 12/0051 20190101; A61M 2205/60 20130101; H04M 2203/6054 20130101; H04W 4/21 20200501; G06K 9/00288 20130101; G06Q 20/3674 20130101; G06F 21/31 20151101; G06F 21/44 20151101; G06Q 20/40 20130101; H04L 61/2571 20130101; H04M 15/755 20130101; H04M 15/753 20130101; H04M 15/7556 20130101; H04M 15/751 20130101; G06Q 20/3267 20200501; G06Q 20/326 20200501; H04L 2209/56 20180101; H04L 2463/082 20130101; G06Q 20/3255 20200501; G06Q 20/20 20200501; G06Q 30/0238 20130101; G06Q 20/351 20130101; G06Q 20/352 20130101; G06Q 20/353 20200501;

FIELD OF SEARCH

726/8; 340/5.52; 340/5.82; 713/186; 902/3; 382/117; 382/118; 382/305; 382/181; 706/902; 706/12; 382/155; 706/45; 706/61; 706/46; 706/47; 706/50; 706/5; 706/52; 707/804; 707/784; 706/13; 706/20; 370/255; 380/28; 379/433.09; 379/114.15; 463/41; 380/247; 398/121

FIELD OF THE INVENTION

The invention 5G-WiFi INSIDE SECURE IRIS BIOMETRICS' LOGIN Broadband-Technology (BB-T) Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm operable with a particular learning algorithm, and/or technique, control by Artificial Intelligence (AI), automating identifications with plurality access of global computer network, accessing web-browser, search-engine, middle-ware, and Operating-System (OS) functionalities across multi-language platforms, via radio waves, and/or optical signals transmitting voice, or video, or video with voice digital signals, sending or receiving interne data, via radio waves, microwave, and/or optical signals.

This invention 5G-WiFi INSIDE SECURE IRIS BIOMETRICS' LOGIN is the embodiment of system and methods for secure communication over freespace, communicating and transmitting space-to-space, space-to-ground, and/or ground-to-space, as Fifth Generation Quantum Technology (5G-QT) sending, and/or receiving radio wave energy, via Evolved Universal Terrestrial Radio Access Network (E-UTRAN), or Universal Terrestrial Radio Access Network (UTRAN) operable as a Global Navigation Satellite System (GNSS), Global System for Mobile-communications (GSM) with Global Positioning System (GPS), and Global Positioning System Aided Geo Augmented Navigation (GAGAN), as a Fifth Generation Core Network (5GCN), and Fifth Generation System (5G-S) for:

- Universal Terrestrial Radio Access and Universal Mobile Telecommunication Systems (UTRA/UMTS)
- Fifth Generation Radio Access Network (5G-RAN)
- Fifth Generation New Radio (5G-NR), via, Fifth Generation Spectrum (5G-S) Evolved Universal Terrestrial Radio Access (E-UTRA), and/or Universal Terrestrial Radio Access (UTRA)
- Radio Access Technology (RAT), using Multiple Output (MIMO) Over-the-Air (OTA), connecting Fifth Generation New Radio (5G-NR)
- Digital Terrestrial Television (DTT) for Digital Video Broadcasting-Terrestrial (DVB-T)
- Digital Terrestrial Television (DTT) for Digital Video Broadcasting (DVB)
- Digital Terrestrial Television (DTT) for Digital Video Broadcasting-Handheld (DVB-H)
- Digital Terrestrial Television (DTT) for Enhanced Definition Television (EDTV)
- Digital Terrestrial Television (DTT) for High Definition Television (HDTV)
- Digital Terrestrial Television (DTT) for Video Broadcasting-atellite services to Handhelds (DVB-SH)
- Digital Terrestrial Television (DTT) for Digital Video Broadcasting-Next Generation Handheld (DVB-NGH)
- Digital Terrestrial Television (DTT) for Digital Terrestrial Multimedia Broadcast (DTMB) for Integrated Services Digital Broadcasting-Satellite (ISDB-S) for Digital Television (DTV) and digital radio Wherein internet-Interoperability ($i_2$) wireless modem soldered onto motherboard as secure element into Central Processing Units (CPU) enable wireless-connections, and wireless Machine-to-Machine (M2M) communication via Fifth Generation Radio Access Network (5G-RAN), or Fifth Generation New Radio (5G-NR), linking proprietary internet-interoperability $i_2$ FOLDER smartphones, proprietary internet-interoperability non-foldable $i_2$ MINI smartphones, proprietary internet-interoperability ($i_2$) Mobile Equipment (ME), proprietary Cellular Internet-of-Things (CIoT), and/or other apparatus including Mobile Phones (MP), Handheld Devices (HD), User Equipment (UE), Mobile Equipment (ME), Tablet Computers (TC), Laptop Computers (LC), Desktop Computers (DC), Network computers (NC), Mobile/Handheld Television (M/H-TV), Next Generation Handheld Television (NGH-TV), Enhanced Definition Television (EDTV), High Definition Television (HDTV), Fifth Generation Quantum Satellite Multimedia Set-top-boxes (5G-QSMS), Internet of Things (IoT), Cellular Internet of Things (CIoT), Internet of Things Device (IoT-D), Industrial Internet of Things (I-IoT), Industries of the Future Apparatus (IotF-A), Industries of the Future Machine (IotF-M), Automated Teller Machines (ATM), point-of-Sale (POS) apparatus, Drive-Thru-Restaurant contactfree self ordering and self-pay machines accessible via proprietary internet-interoperability ($i_2$) smartphones, Drive-in-Theater contactfree movie selection and self-pay machines accessible via proprietary internet-interoperable ($i_2$) smartphones, self-check-out machines, airport self-check-in baggage machines, self-check-in reservation terminals, self-check-in reservation kiosk, airline self-booking and check-in e-ticketing machines, cruise-ships self-booking and check-in e-ticket machines, rail-transit self-booking and check-in e-ticket machines, self-serve money-transfer machines, airports self-check-in machines, automated car-rental-n-car-return machines, hotel self-check-in and check-out machines, motel self-check-in and check-out machines, automated self-check-cashing machines, self-serve online-bill-payment machines, sporting-events self-pay-n-check-in entrance machines, movie theater self-pay-n-check-in entrance machines, workplace card-free time-clocking machines, electronic schools attendance e-registers, security-gate entrance machines, automated transportation facility access parking machines, automated transportation facility access toll passage machines, key-less buildings-access entrance machines, key-less secure-facilities entrance machines, cash-free self-pay-n-check-in and check-out entertainment appliances (entertainment machines entertainment apparatus/entertainment devices), cash-free self-pay-n-check-in and check-out amusement machines (amusement apparatus/amusement devices), cash-free self-pay-n-check-in and check-out gambling machines (gambling apparatus or gambling devices), automated voting machines, Hybrid electric vehicles (HEV) key-less entry and key-less ignition switch, smart-vehicles key-less entry and key-less ignition switch, key-less entry and key-less ignition switch-on of driver-free autonomous vehicles (self-driving cars) using robotic technology and Quantum Global-satellite Positioning System (QGPS) relaying data-cache to computers operable with machine learning algorithm using a particular learning algorithm, and/or technique, control by Artificial Intelligence (AI), connecting Fifth Generation Radio Access Network (5G-RAN), Fifth Generation New Radio (5G-NR), Mobile Phones (MP), Handheld Devices (HD), User Equipment (UE), Mobile Equipment (ME),Tablet Computers (TC), Laptop Computers (LC), Desktop Computers (DC), Network computers (NC), Mobile/Handheld Television (M/H-TV), Next Generation Handheld Television (NGH-TV), Enhanced Definition Television (EDTV), High Definition Television (HDTV), Fifth Generation Quantum Satellite Multimedia Set-top-boxes (5G-QSMS), Internet of Things (IoT), Internet of Things Device (IoT-D), Industrial Internet of Things (I-IoT), Industries of the Future Apparatus (IotF-A), Industries of the Future Machine (IotF-M), self-banking Automated Teller Machines (ATM), point-of-Sale (POS) apparatus, Drive-Thru-Restaurant contactfree self ordering and self-pay machines accessible via proprietary internet-interoperability ($i_2$) smartphones, Drive-in-Theater contactfree movie selection and self-pay machines accessible via proprietary internet-interoperability ($i_2$) smartphones, self-check-out machines, airport self-check-in baggage machines, self-check-in reservation terminals, self-check-in reservation kiosk, airline self-booking and check-in e-ticket machines, cruise-ships self-booking and check-in e-ticket machines, rail-transit self-booking and check-in e-ticket machines, self-serve money-transfer machines, airports self-check-in machines, automated car-rental-n-car-return machines, hotel self-check-in and check-out machines, motel self-check-in and check-out machines, automated self-check-cashing machines, self-serve online-bill-payment machines, sporting-events self-pay-n-check-in entrance machines, movie theater self-pay-n-check-in entrance machines, workplace card-free time-clocking machines, electronic schools attendance e-registers, security-gate entrance machines, automated transportation facility access parking machines, automated transportation facility access toll passage machines, key-less buildings-access entrance machines, key-less secure-facilities entrance machines, cash-free self-pay-n-check-in and check-out entertainment appliances (entertainment machines entertainment apparatus/entertainment devices), cash-free self-pay-n-check-in and check-out amusement machines (amusement apparatus/amusement devices), cash-free self-pay-n-check-in and check-out gambling machines (gambling apparatus or gambling devices), automated voting machines, Hybrid electric vehicles (HEV) key-less entry and key-less ignition switch, smart-vehicles key-less entry and key-less ignition switch, key-less entry and key-less ignition switch-on of driver-free autonomous vehicles (self-driving cars) using robotic technology and Quantum Global-satellite Positioning System (QGPS) relaying data-cache to computers operable with machine learning algorithm using a particular learning algorithm, and/or technique, control by Artificial Intelligence (AI), processing electronic data used for routing control, Hybrid electric vehicles (HEV) cash-free self-serve electric charge-stations, self-serve gas-pumps, other cash-free apparatus, robots, Robotic Equipment (RE), and/or Robotic Machines (RM) access by "Fifth Generation Wireless Freespace internet-connectivity" (5G-WiFi) INSIDE SECURE IRIS BIOMETRICS' LOGIN as downloadable or embedded as Fifth Generation Software Hardware Security Module (5G-SoftHSM) embedded into Hardware Security Module (HSM), as cybersecurity software application suite with means to encryption, decryption, upgrade or install encryption for protecting transmitted data associated with 5G-WiFi INSIDE SECURE IRIS BIOMETRICS' LOGIN Automated Iris-biometrics-login Identification System (MIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, operable with machine learning algorithm using a particular learning algorithm, and/or technique, control by Artificial Intelligence (AI), automating identifications with plurality access of global computer network, accessing web-browser, search-engine, middle-ware, and Operating-System (OS) functionalities across multi-language platforms, via radio waves, and/or optical signals transmitting voice, or video, or video with voice digital signals, sending or receiving internet data, via radio waves, microwave, and/or optical signals.

Wherein mechanisms functionalities, methods of the invention 5G-WiFi INSIDE SECURE IRIS BIOMETRICS' LOGIN proprietary internet-Interoperability ($i_2$) Machine-to-Machine (M2M) system-architecture-evolution solution (SAES), allowing freedom to individual deployment whether to function as a Machine-to-Machine (M2M) or a standalone include, but not limited to:

proprietary internet-Interoperability ($i_2$) Machine-to-Machine (M2M) system-architecture-evolution solution (SAES), allowing 5G-WiFi INSIDE SECURE IRIS BIOMETRICS' LOGIN proprietary internet-Interoperability ($i_2$) Machine-to-Machine (M2M) system-architecture-evolution solution (SAES), allowing Global System for Mobile Communications Association(GSMA) Networks internet-Interoperability ($i_2$) Machine-to-Machine (M2M) Applications and/or internet-Interoperability ($i_2$) Machine-to-Machine (M2M) Services by means of open access proprietary internet-Interoperability ($i_2$) Machine-to-Machine (M2M) system-architecture-evolution solution (SAES), allowing communication between Machine-to-Machine (M2M) applications using multiple communication means based on Internet Protocol (IP) Access proprietary internet-Interoperability ($i_2$) Machine-to-Machine (M2M) system-architecture-evolution solution (SAES), allowing communication means accommodating devices with constrained computing such as small Central Processing Units (CPU), memory, battery or communication capabilities, namely, wireless modem proprietary internet-Interoperability ($i_2$) Machine-to-Machine (M2M) system-architecture-evolution solution (SAES), allowing communication means accommodating devices with rich computing capabilities such as large Central Processing Units (CPU), memory, or communication capabilities, namely, fifth generation (5G) wireless modem proprietary internet-Interoperability ($i_2$) Machine-to-Machine (M2M) system-architecture-evolution solution (SAES), allowing session-less application communications facilitating Machine-to-Machine (M2M) applications requiring this protocol proprietary internet-Interoperability ($i_2$) Machine-to-Machine (M2M) system-architecture-evolution solution (SAES), allowing telecommunications networking to Machine-to-Machine (M2M) applications service Short Message Service (SMS)

proprietary internet-Interoperability ($i_2$) Machine-to-Machine (M2M) system-architecture-evolution solution (SAES), applications service allowing localization proprietary internet-Interoperability ($i_2$) Machine-to-Machine (M2M) system-architecture-evolution solution (SAES), applications service allowing data transfer proprietary internet-Interoperability ($i_2$) Machine-to-Machine (M2M) system-architecture-evolution solution (SAES), applications service providing mechanism for internet-Interoperability ($i_2$) Machine-to-Machine (M2M) applications to interact with applications and data or information managed by different Machine-to-Machine (M2M) Service Provider proprietary internet-Interoperability ($i_2$) Machine-to-Machine (M2M) system-architecture-evolution solution (SAES), applications service providing mechanism for internet-Interoperability (h) Machine-to-Machine (M2M) system to ensure data integrity This invention "5G-WiFi INSIDE SECURE IRIS BIOMETRICS' LOGIN" Broadband-technology (BB-T) Automated Iris-biometrics-login Identification System (AIIS), as a Convolutional Neural Network (CNN) supporting Machine-to-Machine (M2M) system-architecture-evolution solution (SAES), operable as Fifth Generation (5G) technology using quantum computers operable with machine learning algorithm using a particular learning algorithm, and/or technique, control by Artificial Intelligence (AI), operable for telecommunication with supporting proprietary satellite-communication system "Aurora Polaris" comprising Geostationary (GEO) and Low Earth Orbiting (LEO) Illuminated-flying-saucer Designed Satellite with proprietary Collision Control ($C_2$) Navigation System (NS) and Global Satellite Positioning System (GPS), operable for communication over freespace linking satellites, satellite-mounted antennas, or mounted-antennas on objects in space orbiting about the earth, aircraft-mounted antennas, lighter-than-air device mounted antennas, transmitting relay signal to omnidirectional Satellite Ground Station (SGS) (earth-station/ground terminal), vehicle mounted satellite earth-station, locomotive or passenger transit mounted satellite earth stations, buoyant or waterborne satellite earth stations, watercraft or vessel mounted satellite earth stations, very small aperture terminal (VSAT) satellite earth stations, satellite Mobile-Earth-Stations (MES), handheld earth stations for Satellite-Personal-Communications-Networks (S-PCN), satellite earth stations buried underground or submerged under water.

Wherein the position of satellite antennas beams are changed by electrical means, with antennas feed network or multiple antennas switching, and satellite earth stations operable as receivers and transceivers for wireless communication, connecting Fifth Generation Radio Access Network (5G-RAN), Fifth Generation New Radio (5G-NR), Mobile Phones (MP), Handheld Devices (HD), User Equipment (UE), Mobile Equipment (ME), Tablet Computers (TC), Laptop Computers (LC), Desktop Computers (DC), Network computers (NC), Mobile/Handheld Television (M/H-TV), Next Generation Handheld Television (NGH-TV), Enhanced Definition Television (EDTV), High Definition Television (HDTV), Fifth Generation Quantum Satellite Multimedia Set-top-boxes (5G-QSMS), Internet of Things (IoT), Internet of Things Device (IoT-D), Industrial Internet of Things (I-IoT), Industries of the Future Apparatus (IotF-A), Industries of the Future Machine (IotF-M), self-banking Automated Teller Machines (ATM), point-of-Sale (POS) apparatus, Drive-Thru-Restaurant contactfree self ordering and self-pay machines accessible via proprietary internet-interoperability ($i_2$) smartphones, Drive-in-Theater contactfree movie selection and self-pay machines accessible via proprietary internet-interoperability ($i_2$) smartphones, self-check-out machines, airport self-check-in baggage machines, self-check-in reservation terminals, self-check-in reservation kiosk, airline self-booking and check-in e-ticket machines, cruise-ships self-booking and check-in e-ticket machines, rail-transit, self-booking and check-in e-ticket machines, self-serve money-transfer machines, airports self-check-in machines, automated car-rental-n-car-return machines, hotel self-check-in and check-out machines, motel self-check-in and check-out machines, automated self-check-cashing machines, self-serve online-bill-payment machines, sporting-events self-pay-n-check-in entrance machines, movie theater self-pay-n-check-in entrance machines, workplace card-free time-clocking machines, electronic schools attendance e-registers, security-gate entrance machines, automated transportation facility access parking machines, automated transportation facility access toll passage machines, key-less buildings-access entrance machines, key-less secure-facilities entrance machines, cash-free self-pay-n-check-in and check-out entertainment appliances (entertainment machines entertainment apparatus/entertainment devices), cash-free self-pay-n-check-in and check-out amusement machines (amusement apparatus/amusement devices), cash-free self-pay-n-check-in and check-out gambling machines (gambling apparatus or gambling devices), automated voting machines, Hybrid electric vehicles (HEV) key-less entry and key-less ignition switch, smart-vehicles key-less entry and key-less ignition switch, key-less entry and key-less ignition switch-on of driver-free autonomous vehicles (self-driving cars) using robotic technology and Quantum Global-satellite Positioning System (QGPS) relaying data-cache to computers operable with machine learning algorithm using a particular learning algorithm, and/or technique, control by Artificial Intelligence (AI), processing electronic data used for routing control, Hybrid electric vehicles (HEV) cash-free self-serve electric charge-stations, self-serve gas-pumps, other cash-free apparatus, robots, Robotic Equipment (RE), and/or Robotic Machines (RM) access by Fifth Generation Wireless Freespace internet-connectivity (5G-WiFi) INSIDE SECURE IRIS BIOMETRICS' LOGIN as downloadable or embedded as Fifth Generation Software Hardware Security Module (5G-SoftHSM) embedded into Hardware Security Module (HSM), as cybersecurity software application suite, operable as an internet-Interoperability ($i_2$) Machine-to-Machine (M2M) system-architecture-evolution solution (SAES), allowing freedom to individual deployment whether to function as a Machine-to-Machine (M2M) or a standalone, with means to encryption, decryption, upgrade or install encryption for protecting transmitted data associated with 5G-WiFi INSIDE SECURE IRIS BIOMETRICS' LOGIN Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, operable with machine learning algorithm using a particular learning algorithm, and/or technique, control by Artificial Intelligence (AI), automating identifications with plurality access of global computer network, accessing web-browser, search-engine, middle-ware, and Operating-System (OS) functionalities across multi-language platforms, via radio waves, and/or optical signals transmitting voice, or video, or video with voice digital signals, sending or receiving internet data, via radio waves, microwave, and/or optical signals.

The invention "5G-WiFi INSIDE SECURE IRIS BIOMETRICS' LOGIN" Broadband-Technology (BB-T) Automated Iris-biometrics-login Identification System (AIIS), as a Convolutional Neural Network (CNN) supporting Machine-to-Machine (M2M) system-architecture-evolution solution (SAES), operable with proprietary satellite-communication system "Aurora Polaris" comprising Geostationary (GEO) and Low Earth Orbiting (LEO) Illuminated-flying-saucer Designed Satellite with proprietary Collision Control ($C_2$) Navigation System (NS) and Global Satellite Positioning System (GPS), operable as aerial-vehicles supporting Fifth Generation System (5G-S), providing Universal Terrestrial Radio Access (UTRA) and Evolved Universal Terrestrial Radio Access (E-UTRA).

Wherein the invention "5G-WiFi INSIDE SECURE IRIS BIOMETRICS' LOGIN"

Broadband-Technology (BB-T) Automated Iris-biometrics-login Identification System (AIIS), as a Convolutional Neural Network (CNN) supporting Machine-to-Machine (M2M) system-architecture-evolution solution (SAES), using an end-to-end transmission systems, via Fifth Generation Quantum Satellite (5G-QS), Fifth Generation Quantum Satellite Antennas (5G-QSA), Universal Terrestrial Radio Access (UTRA), and/or Evolved Universal Terrestrial Radio Access (E-UTRA), Radio Access Technology (RAT), Fifth Generation Quantum Satellite Repeaters (5G-QSR), Fifth Generation Quantum Satellite Optical Repeaters Systems (5G-QSORS), Fifth Generation Quantum Satellite Receivers and Transmitters Systems (5G-QSRAT), Fifth Generation Quantum Satellite Microwave and Optical Transceivers (5G-QSM/OT), and Fifth Generation Quantum Satellite Ground Antennas (5G-QSGA).

This invention "5G-WiFi INSIDE SECURE IRIS BIOMETRICS' LOGIN" Broad-band-technology (BB-T) Automated Iris-biometrics-login Identification System (AIIS), as a Convolutional Neural Network (CNN) supporting Machine-to-Machine (M2M) system-architecture-evolution solution (SAES), using Satellite-communication Network (SN) operable with Fifth Generation Quantum Satellite Microwave ant Optical Transceivers (5G-QSM/OT), and/or Fifth Generation Quantum Satellite Receivers And Transmitters Systems (5G-QSRATs) receiver, communicate with Fifth Generation Quantum Satellite (5G-QS), and/or Fifth Generation Quantum Satellite Ground Antennas (5G-QS-GAs) with frequency shift, transmitting signals from Fifth Generation Quantum Satellite Antennas (5G-QSA), connecting Fifth Generation Quantum Satellite Multimedia Set-top-boxes (5G-QSMS), converting waves signals as voice, or video, and/or video with voice into digital broadcast signals for displaying unto subscribers, users, and/or client a.k.a members' television-set, Enhanced Definition Television (EDTV), High Definition Television (HDTV), Fifth Generation Quantum Satellite Multimedia Set-top-boxes (5G-QSMS), Mobile/Handheld Television (M/H-TV), Next Generation Handheld Television (NGH-TV), proprietary internet-interoperability ($i_2$) FOLDER smartphones, proprietary internet-interoperability ($i_2$) non-foldable $i_2$ MINI smartphones, proprietary internet-interoperability ($i_2$) Mobile Equipment (ME), proprietary Cellular Internet-of-Things (CIoT), and/or other apparatus including Mobile Phones (MP), Handheld Devices (HD), User Equipment (UE), Mobile Equipment (ME), Tablet Computers (TC), Laptop Computers (LC), Desktop Computers (DC).

The invention "5G-WiFi INSIDE SECURE IRIS BIOMETRICS' LOGIN" Broad-band-technology (BB-T) Automated Iris-biometrics-login Identification System (AIIS), as a Convolutional Neural Network (CNN) supporting Machine-to-Machine (M2M) system-architecture-evolution solution (SAES), operable as downloadable or embedded as Fifth Generation Software Hardware Security Module (5G-SoftHSM) embedded into Hardware Security Module (HSM), as cybersecurity software application suite, operable as an internet-Interoperability ($i_2$) Machine-to-Machine (M2M) system-architecture-evolution solution (SAES), allowing freedom to individual deployment whether to function as a Machine-to-Machine (M2M) or a standalone, with means to encryption, decryption, upgrade or install, encryption and protecting transmitted data associated with 5G-WiFi INSIDE SECURE IRIS BIOMETRICS' LOGIN Automated Iris-biometrics-login Identification System (AIIS), as a Convolutional Neural Network (CNN) supporting Machine-to-Machine (M2M) system-architecture-evolution solution (SAES), using machine learning algorithm, control by Artificial Intelligence (AI), operable with Fifth Generation Radio Access Network (5G-RAN), Fifth Generation New Radio (5G-NR), Mobile Phones (MP), Handheld Devices (HD), User Equipment (UE), Mobile Equipment (ME),Tablet Computers (TC), Laptop Computers (LC), Desktop Computers (DC), Network computers (NC), Mobile/Handheld Television (M/H-TV), Next Generation Handheld Television (NGH-TV), Enhanced Definition Television (EDTV), High Definition Television (HDTV), Fifth Generation Quantum Satellite Multimedia Set-top-boxes (5G-QSMS), Internet-of-Things (IoT), Internet-of-Things Device (IoT-D), Industrial Internet-of-Things (I-IoT), Industries of the Future Apparatus (IotF-A), Industries of the Future Machine (IotF-M), Automated Teller Machines (ATM), point-of-Sale (POS) apparatus, Drive-Thru-Restaurant contactfree self ordering and self-pay machines accessible via proprietary internet-interoperability ($i_2$) smartphones, Drive-in-Theater contactfree movie selection and self-pay machines accessible via proprietary internet-interoperability ($i_2$) smartphones, self-check-out machines, airport self-check-in baggage machines, self-check-in reservation terminals, self-check-in reservation kiosk, airline self-booking and check-in e-ticket machines, cruise-ships self-booking and check-in e-ticket machines, rail-transit self-booking and check-in e-ticket machines, self-serve money-transfer machines, airports self-check-in machines, automated car-rental-n-car-return machines, hotel self-check-in and check-out machines, motel self-check-in and check-out machines, automated self-check-cashing machines, self-serve online-bill-payment machines, sporting-events self-pay-n-check-in entrance machines, movie theater self-pay-n-check-in entrance machines, workplace card-free time-clocking machines, electronic schools attendance e-registers, security-gate entrance machines, automated transportation facility access parking machines, automated transportation facility access toll passage machines, key-less buildings-access entrance machines, key-less secure-facilities entrance machines, cash-free self-pay-n-check-in and check-out entertainment appliances (entertainment machines entertainment apparatus/entertainment devices), cash-free self-pay-n-check-in and check-out amusement machines (amusement apparatus/amusement devices), cash-free self-pay-n-check-in and check-out gambling machines (gambling apparatus or gambling devices), automated voting machines, Hybrid electric vehicles (HEV) key-less entry and key-less ignition switch, smart-vehicles key-less entry and key-less ignition switch, key-less entry and key-less ignition switch-on of driver-free autonomous vehicles (self-driving cars) using robotic technology and Quantum Global-satellite Positioning System (QGPS) relaying data-cache to computers operable with machine learning algorithm using a particular learning algorithm, and/or technique, control by Artificial Intelligence (AI), processing electronic data used for routing control, Hybrid electric vehicles (HEV) cash-free self-serve electric charge-stations, self-serve gas-pumps, other cash-free apparatus, robots, Robotic Equipment (RE), and/or Robotic Machines (RM) access by "Fifth Generation Wireless Freespace internet-connectivity" (5G-WiFi) INSIDE SECURE IRIS BIOMETRICS' LOGIN as downloadable or embedded as Fifth Generation Software Hardware Security Module (5G-SoftHSM), embedded into Hardware Security Module (HSM), as cybersecurity software application suite, operable as an internet-Interoperability ($i_2$) Machine-to-Machine (M2M) system-architecture-evolution solution (SAES), allowing freedom to individual deployment whether to function as a Machine-to-Machine (M2M) or a standalone, with means to encryption, decryption, upgrade or install encryption for protecting transmitted data associated with 5G-WiFi INSIDE SECURE IRIS BIOMETRICS' LOGIN Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm operable with a particular learning algorithm, and/or technique, control by Artificial Intelligence (AI), automating identifications with plurality access of global computer network, accessing web-browser, search-engine, middleware, and Operating-System (OS) functionalities across multi-language platforms, with machine translation, via radio waves, and/or optical signals transmitting voice, or video, or video with voice digital signals, sending or receiving internet data, via radio waves, microwave, and/or optical signals.

Wherein the invention 5G-WiFi INSIDE SECURE IRIS BIOMETRICS' LOGIN Broad-band-technology (BB-T) Automated Iris-biometrics-login Identification System (MIS), as a Convolutional Neural Network (CNN) supporting Machine-to-Machine (M2M) system-architecture-evolution solution (SAES), operable as downloadable or embedded as Fifth Generation Software Hardware Security Module (5G-SoftHSM) embedded into hardware security module (HSM), operable as Cybersecurity software application suite, linking internet-Interoperability (ii) Machine-to-Machine (M2M) system-architecture-evolution solution (SAES), allowing freedom to individual deployment whether to function as a Machine-to-Machine (M2M) or a standalone, operable functions include storage, accessing, and control, such as access blocking, access restricting, memory-access blocking, access-timing, authentication, encrypting iris-biometrics' login data for authentication, automating subscribers, users, and/or client a.k.a members' virtual identifications, verification, authentication, and authorization, for accessibility, or access-blockage to public machines, personal devices, apparatus, and/or systems, namely, Fifth Generation Radio Access Network (5G-RAN), Fifth Generation New Radio (5G-NR), Mobile Phones (MP), Handheld Devices (HD), User Equipment (UE), Mobile Equipment (ME),Tablet Computers (TC), Laptop Computers (LC), Desktop Computers (DC), Network computers (NC), Mobile/Handheld Television (M/H-TV), Next Generation Handheld Television (NGH-TV), Enhanced Definition Television (EDTV), High Definition Television (HDTV), Fifth Generation Quantum Satellite Multimedia Set-top-boxes (5G-QSMS), Internet-of-Things (IoT), Internet of Things Device (IoT-D), Industrial Internet of Things (I-IoT), Industries of the Future Apparatus (IotF-A), Industries of the Future Machine (IotF-M), self-banking Automated Teller Machines (ATM), point-of-Sale (POS) apparatus, Drive-Thru-Restaurant contactfree self ordering and self-pay machines accessible via proprietary internet-interoperability ($i_2$) smartphones, Drive-in-Theater contactfree movie selection and self-pay machines accessible via proprietary internet—interoperability ($i_2$) smartphones, self-check-out machines, airport self-check-in baggage machines, self-check-in reservation terminals, self-check-in reservation kiosk, airline self-booking and check-in e-ticketing machines, cruise-ships self-booking and check-in e-ticket machines, rail-transit self-booking and check-in e-ticket machines, self-serve money-transfer machines, airports self-check-in machines, automated car-rental-n-car-return machines, hotel self-check-in and check-out machines, motel self-check-in and check-out machines, automated self-check-cashing machines, self-serve online-bill-payment machines, sporting-events self-pay-n-check-in entrance machines, movie theater self-pay-n-check-in entrance machines, workplace card-free time-clocking machines, electronic schools attendance e-registers, security-gates entrance machines, automated transportation facility access parking machines, automated transportation facility access toll passage machines, key-less buildings-access entrance machines, key-less secure-facilities entrance machines, cash-free self-pay-n-check-in and check-out entertainment appliances (entertainment machines entertainment apparatus/entertainment devices), cash-free self-pay-n-check-in and check-out amusement machines (amusement apparatus/amusement devices), cash-free self-pay-n-check-in and check-out gambling machines (gambling apparatus or gambling devices), automated voting machines, Hybrid electric vehicles (HEV) key-less entry and key-less ignition switch, smart-vehicles key-less entry and key-less ignition switch, key-less entry and key-less ignition switch-on of driver-free autonomous vehicles (self-driving cars) using robotic technology and Quantum Global-satellite Positioning System (QGPS) relaying data-cache to computers operable with machine learning algorithm using a particular learning algorithm, and/or technique, control by Artificial Intelligence (AI), processing electronic data used for routing control, Hybrid electric vehicles (HEV) cash-free self-serve electric charge-stations, self-serve gas-pumps, other cash-free apparatus, robots, Robotic Equipment (RE), and/or Robotic Machines (RM) access by "Fifth Generation Wireless Freespace internet-connectivity" (5G-WiFi) INSIDE SECURE IRIS BIOMETRICS' LOGIN as downloadable or embedded as Fifth Generation Software Hardware Security Module (5G-SoftHSM), embedded into Hardware Security Module (HSM), as cybersecurity software application suite with means to encryption, decryption, upgrade or install encryption for protecting transmitted data associated with 5G-WiFi INSIDE SECURE IRIS BIOMETRICS' LOGIN Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm operable with a particular learning algorithm, and/or technique, control by Artificial Intelligence (AI), automating identifications with plurality access of global computer network, accessing web-browser, search-engine, middle-ware, and Operating-System (OS) functionalities across multi-language platforms, via radio waves, and/or optical signals transmitting voice, or video, or video with voice digital signals, sending or receiving internet data, via radio waves, microwave, and/or optical signals.

The invention 5G-WiFi INSIDE SECURE IRIS BIOMETRICS' LOGIN Broad-band-technology (BB-T) Automated Iris-biometrics-login Identification System (AIIS), as a Convolutional Neural Network (CNN) supporting Machine-to-Machine (M2M) system-architecture-evolution solution (SAES), operable as Fifth Generation (5G) Broadcast System for linear TV and radio services; Local Terminal Emulator (LTE) based Fifth Generation (5G) terrestrial broadcast system, wherein Fifth Generation (5G) Broadcast system support include:

Support of Free-to-Air (FTA) and Receive-Only Mode (ROM) services over Fifth Generation (5G)

Network dedicated to linear television and radio broadcast transmission using supplemental downlink channels, and spectrum Single Frequency Network (SFN) deployments with Inter-Site Distance (ISD) significantly larger than a typical Inter-Site Distance (ISD) associated with typical cellular deployments Support for mobility scenarios including speeds of up to 250 km/h to support receivers in cars, with external omni-directional antennas Support for common streaming distribution formats such as Dynamic Streaming over HTTP (DASH), Common Media Application Format (CMAF) and HTTP Live Streaming (HLS)

Support for Internet Protocol based (IP-based) services such as Internet Protocol Television (IPTV), and/or Adaptive Bit Rate (ABR) multicast Support for different file delivery services such as scheduled delivery or file carousels This invention 5G-WiFi INSIDE SECURE IRIS BIOMETRICS' LOGIN Broad-band-technology (BB-T) Automated Iris-biometrics-login Identification System (AIIS), as a Convolutional Neural Network (CNN) supporting Machine-to-Machine (M2M) system-architecture-evolution solution (SAES), facilitating the extraction of iris-biometrics from both eyes' iris and pupil, or periocular biometric features from the periocular regions of the face, eyes' iris and pupil if an enrolling subscribers, users, and/or client a.k.a members is wearing a helmet, a mask, a religious veil, or a face occlusion hair style, during in the preprocessing of subscribers, users, and/or client a.k.a members' virtual-identifications.

The invention "5G-WiFi INSIDE SECURE IRIS BIOMETRICS' LOGIN" Broad-band-technology (BB-T) Automated Iris-biometrics-login Identification System (AIIS), as a Convolutional Neural Network (CNN) supporting Machine-to-Machine (M2M) system-architecture-evolution solution (SAES), facilitating extraction of the eyes' pupil are included in the extraction of the biometric-data during preprocessing to guard against spoofing, using light to ensure iris-biometrics is of a living being, and not from a deceased, in low light the pupil will dilates but constrict in bright light.

Wherein advantages of capturing, extracting, and storing the biometrics of both eyes' iris, as digital templates, allow subscribers, users, and/or client a.k.a members to use iris-biometrics from either eye's iris, in any event a bandage is covering one eye during a future identification for verification, authentication, and authorization.

The invention "5G-WiFi INSIDE SECURE IRIS BIOMETRICS' LOGIN" Broad-band-technology (BB-T) Automated Iris-biometrics-login Identification System (AIIS), as a Convolutional Neural Network (CNN) supporting Machine-to-Machine (M2M) system-architecture-evolution solution (SAES), using methods culminating with a particular generic machine learning algorithmic finite number of steps to generate iris-biometrics' login machine learning algorithm, operable as iris-biometrics' login virtual identifications, paired to enrollee's country specific national identification number, or national passport number, or drivers license number granted in domicile country, for use as a broader secure identification system, stored electronically in databases as digital-templates.

Wherein the invention "5G-WiFi INSIDE SECURE IRIS BIOMETRICS' LOGIN" Broad-band-technology (BB-T) Automated Iris-biometrics-login Identification System (AIIS), as a Convolutional Neural Network (CNN) supporting Machine-to-Machine (M2M) system-architecture-evolution solution (SAES),providing Global Single-Sign-On (G-SSO) protocols for virtual identifications, replacing multiple passwords, automating identifications, with machine learning algorithm using a particular learning algorithm, and/or technique, control by Artificial Intelligence (AI), automating identifications with plurality access of global computer network, accessing web-browser, search-engine, middle-ware, and Operating-System (OS) functionalities across multi-language platforms, with machine translation, via radio waves, and/or optical signals transmitting voice, or video, or video with voice digital signals, sending or receiving interne data, via radio waves, microwave, and/or optical signals.

The invention 5G-WiFi INSIDE SECURE IRIS BIOMETRICS' LOGIN Broad-band-technology (BB-T) Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), operable in facilitating national language, and machine translation multi-language, with multiple network interconnecting across multiple computer communication using cryptography operable as two sets of network, namely, network for security confirmation, network for transaction, using data-storage systems, including, master servers, or slave servers, client servers, mainframe servers, data servers, file servers, authentication servers, transaction servers, communication servers, and proxy servers or gateway servers accessing remote network servers.

This invention 5G-WiFi INSIDE SECURE IRIS BIOMETRICS' LOGIN Broad-band-technology (BB-T) Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), operable as a multi-mode, standalone virtual network or Virtual Private Network (VPN), linking external networks using interconnected computer networks for access control based on subscribers, users, and/or client a.k.a members' identifications, automated for management arrangements, verification, and validation for virtual identifications, classification, authentication, and authorization, with automating multiple translatable virtual addresses, and virtual-identifications, linking subscribers, users, and/or client a.k.a members, via, universal resource locators (URL).

Wherein the invention "5G-WiFi INSIDE SECURE IRIS BIOMETRICS' LOGIN" Broad-band-technology (BB-T) Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), operable linking Satellite-Earth-Stations-and-Systems (SES) Broadband-Satellite-Multimedia (BSM) services and architectures, namely, Mobile-Earth-Stations (MES), including handheld earth stations for Satellite-Personal-Communications-Networks (S-PCN) in the 1.6/2.4 GHz and the 2.0 GHz bands, providing voice and/or data communications under the Mobile-Satellite-Service (MSS), Mobile-Earth-Stations (MES) providing Low-Bit-Rate-Data-Communications (LBRDC) using Low-Earth-Orbiting (LEO) satellites operating below 1 GHz, Satellite-Earth-Stations-and-Systems (SES), Harmonized Standard for Earth-Stations-on-Mobile-Platforms (ESOMP) transmitting towards satellites in non-geostationary orbit, operating in the 27.5 GHz to 29.1 GHz and 29.5 GHz to 30.0 GHz frequency bands, Satellite-Earth-Stations-and-Systems (SES) operable as microwave, and/or optical communication over freespace, linking satellite-mounted antennas or mounted-antennas on objects in space orbiting about the earth, aircraft-mounted antennas, lighter-than-air device mounted antennas, Fifth Generation Quantum Satellite Ground Antennas (5G-QSGAs) operable with earth stations, namely, stationery satellite earth stations operating with proprietary satellite-communication system "Aurora Polaris" comprising Geostationary (GEO) and Low Earth Orbiting (LEO) Illuminated-flying-saucer Designed Satellite with proprietary Collision Control ($C_2$) Navigation System (NS) and Global Satellite Positioning System (GPS), stationery satellite omnidirectional earth-station (ground-station/ground terminal), vehicle mounted satellite earth-station, locomotive or passenger transit mounted satellite earth stations, buoyant or waterborne satellite earth stations, watercraft or vessel mounted satellite earth stations, fixed satellite service or very small aperture terminal (VSAT) satellite earth stations, satellite Mobile-Earth-Stations (MES), handheld earth stations for Satellite-Personal-Communications-Networks (S-PCN), satellite earth stations buried underground or submerged under water.

The invention 5G-WiFi INSIDE SECURE IRIS BIOMETRICS' LOGIN Broad-band-technology (BB-T) Automated Iris-biometrics-login Identification System (AIIS), as a Convolutional Neural Network (CNN) supporting Machine-to-Machine (M2M) system-architecture-evolution solution (SAES),providing Global Single-Sign-On (G-SSO) protocols for virtual identifications, replacing multiple passwords, automating identifications, with machine learning algorithm using a particular learning algorithm, and/or technique, control by Artificial Intelligence (AI), linking wireless distribution systems, via New-Radio (NR) and Next-Generation-Radio-Access-Network (NG-RAN), Evolved Universal Terrestrial Radio Access Network (E-UTRAN), or Universal Terrestrial Radio Access Network (UTRAN) operable as a Global Navigation Satellite System (GNSS), Global System for Mobile-communications (GSM) with Global Positioning System (GPS), and Global Positioning System Aided Geo Augmented Navigation (GAGAN), as Fifth Generation Core Network (5G-CN), and Fifth Generation System (5G-S) and networks, with external connectivity, namely, the internet, Bluetooth, wireless networks, mobile-phone systems, computer-systems, local-area network (LAN), and wide-area networks (WAN).

Wherein the invention "5G-WiFi INSIDE SECURE IRIS BIOMETRICS' LOGIN" Broad-band-technology (BB-T) Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), integrating Network Functions Virtualization (NFV), Multi-access Edge Computing (MEC), millimetre Wave Transmission (mWT) and Non-IP Networking (NIN).

The invention 5G-WiFi INSIDE SECURE IRIS BIOMETRICS' LOGIN Broad-band-technology (BB-T) Automated Iris-biometrics-login Identification System (MIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), facilitating Fifth Generation New Radio (5G NR) using two frequency ranges:

Frequency range 1 (FR1) supporting 6 Ghz frequency bands and below

Frequency band 2 (FR2) supporting bands in the millimeter wavelength (mmWave) range, including the mmWave range 20-60 Ghz which enable Fifth Generation (5G) Ultra Wideband (UWB).

This invention "5G-WiFi INSIDE SECURE IRIS BIOMETRICS' LOGIN" Broad-band-technology (BB-T) Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), operable with Fifth Generation Software Hardware Security Module (5G-SoftHSM), embedded into Hardware Security Module (HSM), configured, developed, and distributed as cybersecurity application suite, operable with internet-Interoperability ($i_2$) Machine-to-Machine (M2M) system-architecture-evolution solution (SAES), allowing freedom to individual deployment whether to function as a Machine-to-Machine (M2M) or a standalone, sharing similar use-interface, exchanging security data across multiple devices, and platforms as: mobile app, web app, and cloud base machine learning algorithm, Artificial Intelligence (AI) software, downloadable or embedded as Fifth Generation Software Hardware Security Module (5G-SoftHSM) embedded into Hardware Security Module (HSM), operable as Cybersecurity software application suite with means to encryption, decryption, upgrade or install encryption for protecting transmitted data associated with 5G-WiFi INSIDE SECURE IRIS BIOMETRICS' LOGIN Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), automating identifications with plurality access of global computer network, accessing web-browser, search-engine, middle-ware, and Operating-System (OS) functionalities across multi-language platforms, via radio waves, and/or optical signals transmitting voice, or video, or video with voice digital signals, sending or receiving interne data, via radio waves, microwave, and/or optical signals.

Wherein the invention "5G-WiFi INSIDE SECURE IRIS BIOMETRICS' LOGIN" Broad-band-technology (BB-T) Automated Iris-biometrics-login Identification System (AHS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), and Fifth Generation Software Hardware Security Module 5G-SoftHSM) embedded into Hardware Security Module (HSM), as cybersecurity application software suite, for distribution as software push-down or pull-down, and/or distributed as downloadable app from proprietary ix App Bank, Apple Store, Google play, or other downloadable app source, or the World Wide Web (web), or install as embedded Software Hardware Fifth Generation Software Hardware Security Module (5G-SoftHSM) embedded into Hardware Security Module (HSM), as cybersecurity software application suite used with multi-processor, multi processing cache systems for multiprocessing or multitasking using proprietary central-processing units (CPU) with embedded Internet-Interoperability (ix) wireless modem soldered onto motherboard as secure element into Central Processing Units (CPU). Wherein internet-Interoperability (ix) wireless modem soldered onto motherboard as secure element into Central Processing Units (CPU) enabling wireless-connections, and wireless Machine-to-Machine (M2M) communication via Fifth Generation Radio Access Network (5G-RAN), or Fifth Generation New Radio (5G-NR), linking proprietary internet-interoperability $i_2$ FOLDER smartphones, proprietary internet-interoperability non-foldable h MINI smartphones, proprietary internet-interoperability ($i_2$) Mobile Equipment (ME), proprietary Cellular Internet-of-Things (CIoT), and/or other apparatus including Mobile Phones (MP), Handheld Devices (HD), User Equipment (UE), Mobile Equipment (ME), Tablet Computers (TC), Laptop Computers (LC), Desktop Computers (DC), Network computers (NC), Mobile/Handheld Television (M/H-TV), Next Generation Handheld Television (NGH-TV), Enhanced Definition Television (EDTV), High Definition Television (HDTV), Fifth Generation Quantum Satellite Multimedia Set-top-boxes (5G-QSMS), Internet of Things (IoT), Cellular Internet of Things (CIoT), Internet-of-Things Device (IoT-D), Industrial Internet-of-Things (I-IoT), Industries of the Future Apparatus (IotF-A), Industries of the Future Machine (IotF-M), Automated Teller Machines (ATM), point-of-Sale (POS) apparatus, Drive-Thru-Restaurant contactfree self ordering and self-pay machines accessible via proprietary internet-interoperability ($i_2$) smartphones, Drive-in-Theater contactfree movie selection and self-pay machines accessible via proprietary internet-interoperable ($i_2$) smartphones, self-check-out machines, airport self-check-in baggage machines, self-check-in reservation terminals, self-check-in reservation kiosk, airline self-booking and check-in e-ticketing machines, cruise-ships self-booking and check-in e-ticket machines, rail-transit self-booking and check-in e-ticket machines, self-serve money-transfer machines, airports self-check-in machines, automated car-rental-n-car-return machines, hotel self-check-in and check-out machines, motel self-check-in and check-out machines, automated self-check-cashing machines, self-serve online-bill-payment machines, sporting-events self-pay-n-check-in entrance machines, movie theater self-pay-n-check-in entrance machines, workplace card-free time-clocking machines, electronic schools attendance e-registers, security-gate entrance machines, automated transportation facility access parking machines, automated transportation facility access toll passage machines, key-less buildings-access entrance machines, key-less secure-facilities entrance machines, cash-free self-pay-n-check-in and check-out entertainment appliances (entertainment machines entertainment apparatus/entertainment devices), cash-free self-pay-n-check-in and check-out amusement machines (amusement apparatus/amusement devices), cash-free self-pay-n-check-in and check-out gambling machines (gambling apparatus or gambling devices), automated voting machines, Hybrid electric vehicles (HEV) key-less entry and key-less ignition switch, smart-vehicles key-less entry and key-less ignition switch, key-less entry and key-less ignition switch-on of driver-free autonomous vehicles (self-driving cars) using robotic technology and Quantum Global-satellite Positioning System (QGPS) relaying data-cache to computers operable with machine learning algorithm, control by Artificial Intelligence (AI) processing electronic data used for routing control, Hybrid electric vehicles (HEV) cash-free self-serve electric charge-stations, self-serve gas-pumps, other cash-free apparatus, robots, Robotic Equipment (RE), and/or Robotic Machines (RM), delivering higher multi-gigabit per second (multi-Gbps) peak data speeds, ultra low latency, with more reliability, massive network capacity, increased availability, a more uniform user experience to a greater number of users, allowing higher performance with improved efficiency, enabling the connecting new industries delivering higher multi-gigabit per second (multi-Gbps) peak data speeds, ultra low latency, with more reliability, massive network capacity, increased availability, a more uniform user experience to a greater number of users, allowing higher performance with improved efficiency.

This invention 5G-WiFi INSIDE SECURE IRIS BIOMETRICS' LOGIN Broad-band-technology (BB-T) Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO), operable with machine learning algorithm using a particular learning algorithm, and/or technique, control by Artificial Intelligence (AI), facilitate the integrating of iris-biometrics with periocular-biometric for enabling the capture of iris-at-a-distance, plus adding voice recognition, audible-communication, to facilitate the visually impaired, wherein communication to handicapped individuals are audio-signals.

The invention 5G-WiFi INSIDE SECURE IRIS BIOMETRICS' LOGIN Broad-band-technology (BB-T) Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications with plurality access of global computer network, operable with machine learning algorithm using a particular learning algorithm, and/or technique, control by Artificial Intelligence (AI), facilitate the pairing of prior biometric modality embedded, or downloaded onto personal devices, or public machines with 5G-WiFi INSIDE SECURE IRIS BIOMETRICS' LOGIN Fifth Generation Software Hardware Security Module (5G-SoftHSM), embedded into Hardware Security Module (HSM), as cybersecurity software application suite, thereby facilitating subscribers, users, and/or client a.k.a members with an alternate system.

This invention 5G-WiFi INSIDE SECURE IRIS BIOMETRICS' LOGIN Broad-band-technology (BB-T) Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO), operable with machine learning algorithm using a particular learning algorithm, and/or technique, control by Artificial Intelligence (AI)), and embedded Fifth Generation Software Hardware Security Module (5G-SoftHSM), embedded into Hardware Security Module (HSM), as cybersecurity software application suite may be paired to fingerprint biometric, and/or facial recognition biometric-data if used for national-security, and/or public safety.

Wherein the invention "5G-WiFi INSIDE SECURE IRIS BIOMETRICS' LOGIN" Broad-band-technology (BB-T) Automated Iris-biometrics-login Identification System (AHS), as a Convolutional Neural Network (CNN) supporting Machine-to-Machine (M2M) system-architecture-evolution solution (SAES),providing Global Single-Sign-On (G-SSO) protocols for virtual identifications, replacing multiple passwords, automating identifications, with machine learning algorithm using a particular learning algorithm, and/or technique, control by Artificial Intelligence (AI), automating identifications with plurality access of global computer network, accessing web-browser, search-engine, middle-ware, and Operating-System (OS) functionalities across multi-language platforms, via radio waves, and/or optical signals transmitting voice, or video, or video with voice digital signals, sending or receiving interne data, via radio waves, microwave, and/or optical signals.

BACKGROUND

The invention 5G-WiFi INSIDE SECURE IRIS BIOMETRICS' LOGIN Broad-band-technology (BB-T) Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) operable with machine learning algorithm using a particular learning algorithm, and/or technique, control by Artificial Intelligence (AI), operable with Fifth Generation Information Technology (5G-IT) cybersecurity application suite, for embedding, and/or downloadable as Fifth Generation Software Hardware Security Module (5G-SoftHSM) embedded into Hardware Security Module (HSM), as cybersecurity software application suite with means to encryption, decryption, upgrade or install encryption for protecting transmitted data associated with 5G-WiFi INSIDE SECURE IRIS BIOMETRICS' LOGIN Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), automating identifications with plurality access of global computer network, accessing web-browser, search-engine, middle-ware, and Operating-System (OS) functionalities across multi-language platforms, via radio waves, and/or optical signals transmitting voice, or video, or video with voice digital signals, sending or receiving internet data, via radio waves, microwave, and/or optical signals. Wherein internet-Interoperability ($i_2$) wireless modem soldered onto motherboard as secure element into Central Processing Units (CPU) enable wireless-connections, and wireless Machine-to-Machine (M2M) communication via Fifth Generation Radio Access Network (5G-RAN), or Fifth Generation New Radio (5G-NR), linking proprietary internet-interoperability $i_2$ FOLDER smartphones, proprietary internet-interoperability non-foldable $i_2$ MINI smartphones, proprietary internet-interoperability ($i_2$) Mobile Equipment (ME), proprietary Cellular Internet-of-Things (CIoT), and/or other apparatus including Mobile Phones (MP), Handheld Devices (HD), User Equipment (UE), Mobile Equipment (ME), Tablet Computers (TC), Laptop Computers (LC), Desktop Computers (DC), Network computers (NC), Mobile/Handheld Television (M/H-TV), Next Generation Handheld Television (NGH-TV), Enhanced Definition Television (EDTV), High Definition Television (HDTV), Fifth Generation Quantum Satellite Multimedia Set-top-boxes (5G-QSMS), Internet of Things (IoT),Cellular Internet of Things (CIoT), Internet of Things Device (IoT-D), Industrial Internet of Things (I-IoT), Industries of the Future Apparatus (IotF-A), Industries of the Future Machine (IotF-M), Automated Teller Machines (ATM), point-of-Sale (POS) apparatus, Drive-Thru-Restaurant contactfree self ordering and self-pay machines accessible via proprietary internet-interoperability ($i_2$) smartphones, Drive-in-Theater contactfree movie selection and self-pay machines accessible via proprietary internet-interoperable ($i_2$) smartphones, self-check-out machines, airport self-check-in baggage machines, self-check-in reservation terminals, self-check-in reservation kiosk, airline self-booking and check-in e-ticketing machines, cruise-ships self-booking and check-in e-ticket machines, rail-transit self-booking and check-in e-ticket machines, self-serve money-transfer machines, airports self-check-in machines, automated car-rental-n-car-return machines, hotel-check-in and check-out machines, motel self-check-in and check-out machines, automated self-check-cashing machines, self-serve online-bill-payment machines, sporting-events self-pay-n-check-in entrance machines, movie theater self-pay-n-check-in entrance machines, workplace card-free time-clocking machines, electronic schools attendance e-registers, security-gate entrance machines, automated transportation facility access parking machines, automated transportation facility access toll passage machines, key-less buildings-access entrance machines, key-less secure-facilities entrance machines, cash-free self-pay-n-check-in and checkout entertainment appliances (entertainment machines entertainment apparatus/entertainment devices), cash-free self-pay-n-check-in and check-out amusement machines (amusement apparatus/amusement devices), cash-free self-pay-n-check-in and check-out gambling machines (gambling apparatus or gambling devices), automated voting machines, Hybrid electric vehicles (HEV) key-less entry and key-less ignition switch, smart-vehicles key-less entry and key-less ignition switch, key-less entry and key-less ignition switch-on of driver-free autonomous vehicles (self-driving cars) using robotic technology and Quantum Global-satellite Positioning System (QGPS) relaying data-cache to computers using artificial intelligence (AI) processing electrical data to control routing, Hybrid electric vehicles (HEV) cash-free self-serve electric charge-stations, self-serve gas-pumps, other cash-free apparatus, robots, Robotic Equipment (RE), and/or Robotic Machines (RM), delivering higher multi-gigabit per second (multi-Gbps) peak data speeds, ultra low latency, with more reliability, massive network capacity, increased availability, a more uniform user experience to a greater number of users, allowing higher performance with improved efficiency, enabling the connecting new industries delivering higher multi-gigabit per second (multi-Gbps) peak data speeds, ultra low latency, with more reliability, massive network capacity, increased availability, a more uniform user experience to a greater number of users, allowing higher performance with improved efficiency.

This invention 5G-WiFi INSIDE SECURE IRIS BIOMETRICS' LOGIN Broad-band-technology (BB-T) Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) operable with machine learning algorithm using a particular learning algorithm, and/or technique, control by Artificial Intelligence (AI), operable as Fifth Generation Information Technology (5G-IT) cybersecurity application suite, for embedding, and/or downloadable as Fifth Generation Software Hardware Security Module (5G-SoftHSM) embedded into Hardware Security Module (HSM), operable as Cybersecurity software application suite with means to encryption, decryption, upgrade or install encryption for protecting transmitted data associated with 5G-WiFi INSIDE SECURE IRIS BIOMETRICS' LOGIN Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), automating identifications with plurality access of global computer network, accessing web-browser, search-engine, middle-ware, and Operating-System (OS) functionalities across multi-language platforms, via radio waves, and/or optical signals transmitting voice, or video, or video with voice digital signals, sending or receiving internet data, via radio waves, microwave, and/or optical signals. Wherein 5G is Fifth Generation technology standard for broadband cellular networks, is a new global wireless standard upgrading from 1G, 2G, 3G, and 4G networks.

The term '$i_2$' is for "internet-Interoperabile" proprietary $i_2$ FOLDER smartphones, proprietary internet-interoperability ($i_2$) non-foldable $i_2$ MINI smartphones, proprietary internet-interoperability ($i_2$) Mobile Equipment (ME), proprietary Cellular Internet-of-Things (CIoT), and/or other apparatus including Mobile Phones (MP), Handheld Devices (HD), User Equipment (UE), Mobile Equipment (ME), Tablet Computers (TC), Laptop Computers (LC), Desktop Computers (DC), Network computers (NC), Mobile/Handheld Television (M/H-TV), Next Generation Handheld Television (NGH-TV), Enhanced Definition Television (EDTV), High Definition Television (HDTV), Fifth Generation Quantum Satellite Multimedia Set-top-boxes (5G-QSMS), Internet of Things (IoT), Cellular Internet of Things (CIoT), Internet of Things Device (IoT-D), Industrial Internet of Things (I-IoT), Industries of the Future Apparatus (IotF-A), Industries of the Future Machine (IotF-M), Automated Teller Machines (ATM), point-of-Sale (POS), other proprietary electronics or apparatus as documented in this patent application of the titled invention "5G-WiFi INSIDE SECURE IRIS BIOMETRICS' LOGIN" Broad-band-technology (BB-T) Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications with plurality access of global computer network, using machine learning algorithm, control by Artificial Intelligence (AI) operable as (5G-SoftHSM) cybersecurity software application suite with means to encryption, decryption, upgrade or install encryption for protecting transmitted data associated with 5G-WiFi INSIDE SECURE IRIS BIOMETRICS' LOGIN Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), automating identifications with plurality access of global computer network, accessing web-browser, search-engine, middle-ware, and Operating-System (OS) functionalities across multi-language platforms, via radio waves, and/or optical signals transmitting voice, or video, or video with voice digital signals, sending or receiving internet data, via radio waves, microwave, and/or optical signals. Wherein proprietary branded internet-interoperability ($i_2$) products as documented in this patent application of the titled invention support Unicode® standard, including Unicode® bidirectional algorithm, UAX#9.

Wherein the term '$i_2$' is for "internet-Interoperabile" proprietary $i_2$ FOLDER smartphones, proprietary internet-interoperability ($i_2$) non-foldable $i_2$ MINI smartphones, proprietary internet-interoperability ($i_2$) Mobile Equipment (ME), proprietary Cellular Internet-of-Things (CIoT), and/or other apparatus including Mobile Phones (MP), Handheld Devices (HD), User Equipment (UE), Mobile Equipment (ME), Tablet Computers (TC), Laptop Computers (LC), Desktop Computers (DC), Network computers (NC), Mobile/Handheld Television (M/H-TV), Next Generation Handheld Television (NGH-TV), Enhanced Definition Television (EDTV), High Definition Television (HDTV), Fifth Generation Quantum Satellite Multimedia Set-top-boxes (5G-QSMS), Internet of Things (IoT), Cellular Internet of Things (CIoT), Internet of Things Device (IoT-D), Industrial Internet of Things (I-IoT), Industries of the Future Apparatus (IotF-A), Industries of the Future Machine (IotF-M), Automated Teller Machines (ATM), point-of-Sale (POS), other proprietary electronics or apparatus as documented in this patent application of the titled invention "5G-WiFi INSIDE SECURE IRIS BIOMETRICS' LOGIN" Broad-band-technology (BB-T) Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications with plurality access of global computer network, accessing web-browser, search-engine, middleware, and Operating-System (OS) functionalities across multi-language platforms, via radio waves, and/or optical signals transmitting voice, or video, or video with voice digital signals, sending or receiving interne data, via radio waves, microwave, and/or optical signals, operable with machine learning algorithm using a particular learning algorithm, and/or technique, control by Artificial Intelligence (AI), and embedded (5G-SoftHSM) embedded into Hardware Security Module (HSM), as cybersecurity software application suite with means to encryption, decryption, upgrade or install encryption for protecting transmitted data associated with 5G-WiFi INSIDE SECURE IRIS BIOMETRICS' LOGIN Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), automating identifications with plurality access of global computer network, accessing web-browser, search-engine, middle-ware, and Operating-System (OS) functionalities across multi-language platforms, via radio waves, and/or optical signals transmitting voice, or video, or video with voice digital signals, sending or receiving internet data, via radio waves, microwave, and/or optical signals. Wherein proprietary branded internet-interoperability ($i_2$) products as documented in this patent application of the titled invention support Fifth-Generation (5G) technical specifications endorsed by 3rd Generation Partnership Project (3GPP), and implemented by the product as advertised, and/or distributed.

The term '$i_2$' is for "internet-Interoperabile" proprietary $i_2$ FOLDER smartphones, proprietary internet-interoperability ($i_2$) non-foldable $i_2$ MINI smartphones, proprietary internet-interoperability ($i_2$) Mobile Equipment (ME), proprietary Cellular Internet-of-Things (CIoT), and/or other apparatus including Mobile Phones (MP), Handheld Devices (HD), User Equipment (UE), Mobile Equipment (ME), Tablet Computers (TC), Laptop Computers (LC), Desktop Computers (DC), Network computers (NC), Mobile/Handheld Television (M/H-TV), Next Generation Handheld Television (NGH-TV), Enhanced Definition Television (EDTV), High Definition Television (HDTV), Fifth Generation Quantum Satellite Multimedia Set-top-boxes (5G-QSMS), Internet of Things (IoT), Cellular Internet of Things (CIoT), Internet of Things Device (IoT-D), Industrial Internet of Things (I-IoT), Industries of the Future Apparatus (IotF-A), Industries of the Future Machine (IotF-M), Automated Teller Machines (ATM), point-of-Sale (POS), other proprietary electronics or apparatus as documented in this patent application of the titled invention "5G-WiFi INSIDE SECURE IRIS BIOMETRICS' LOGIN" Broad-band-technology (BB-T) Automated Iris-biometrics-login Identification System (AIIS), supporting Machine-to-Machine (M2M) system-architecture-evolution solution (SAES), providing Global Single-Sign-On (G-SSO) protocols for virtual identifications, replacing multiple passwords, automating identifications with plurality access of global computer network, using machine learning algorithm, control by Artificial Intelligence (AI), and embedded (5G-SoftHSM), embedded into Hardware Security Module (HSM), operable as cybersecurity software application suite with means to encryption, decryption, upgrade or install encryption for protecting transmitted data associated with 5G-WiFi INSIDE SECURE IRIS BIOMETRICS' LOGIN Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), automating identifications with plurality access of global computer network, accessing web-browser, search-engine, middle-ware, and Operating-System (OS) functionalities across multi-language platforms, via radio waves, and/or optical signals transmitting voice, or video, or video with voice digital signals, sending or receiving internet data, via radio waves, microwave, and/or optical signals. Wherein proprietary branded internet-interoperability ($i_2$) products as documented in this patent application of the titled invention support W3C Recommendation: HTML 5.1 2nd Edition.

Wherein the term '$i_2$' is for "internet-Interoperabile" proprietary $i_2$ FOLDER smartphones, proprietary internet-interoperability ($i_2$) non-foldable $i_2$ MINI smartphones, proprietary internet-interoperability ($i_2$) Mobile Equipment (ME), proprietary Cellular Internet-of-Things (CIoT), and/or other apparatus including Mobile Phones (MP), Handheld Devices (HD), User Equipment (UE), Mobile Equipment (ME), Tablet Computers (TC), Laptop Computers (LC), Desktop Computers (DC), Network computers (NC), Mobile/Handheld Television (M/H-TV), Next Generation Handheld Television (NGH-TV), Enhanced Definition Television (EDTV), High Definition Television (HDTV), Fifth Generation Quantum Satellite Multimedia Set-top-boxes (5G-QSMS), Internet of Things (IoT), Cellular Internet of Things (CIoT), Internet of Things Device (IoT-D), Industrial Internet of Things (I-IoT), Industries of the Future Apparatus (IotF-A), Industries of the Future Machine (IotF-M), Automated Teller Machines (ATM), point-of-Sale (POS), other proprietary electronics or apparatus as documented in this patent application of the titled invention "5G-WiFi INSIDE SECURE IRIS BIOMETRICS' LOGIN" Broad-band-technology (BB-T) Automated Iris-biometrics-login Identification System (AIIS), supporting Machine-to-Machine (M2M) system-architecture-evolution solution (SAES),providing Global Single-Sign-On (G-SSO) protocols for virtual identifications, replacing multiple passwords, automating identifications with plurality access of global computer network, using machine learning algorithm, control by Artificial Intelligence (AI) operable as (5G-SoftHSM), embedded into Hardware Security Module (HSM), as cybersecurity software application suite with means to encryption, decryption, upgrade or install encryption for protecting transmitted data associated with 5G-WiFi INSIDE SECURE IRIS BIOMETRICS' LOGIN Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), automating identifications with plurality access of global computer network, accessing web-browser, search-engine, middle-ware, and Operating-System (OS) functionalities across multi-language platforms, via radio waves, and/or optical signals transmitting voice, or video, or video with voice digital signals, sending or receiving internet data, via radio waves, microwave, and/or optical signals. Wherein proprietary branded internet-interoperability ($i_2$) products as documented in this patent application of the titled invention support the technical specifications for the US Department of Transportation, Federal Aviation Administration, Wide-Area-Augmentation-System (WAAS) applicable to DTFA01-96-C-00025, 2001: Specification for the Wide-Area-Augmentation-System (WAAS).

The term '$i_2$' is for "internet-Interoperabile" proprietary ii FOLDER smartphones, proprietary internet-interoperability ($i_2$) non-foldable $i_2$ MINI smartphones, proprietary internet-interoperability ($i_2$) Mobile Equipment (ME), proprietary Cellular Internet-of-Things (CIoT), and/or other apparatus including Mobile Phones (MP), Handheld Devices (HD), User Equipment (UE), Mobile Equipment (ME), Tablet Computers (TC), Laptop Computers (LC), Desktop Computers (DC), Network computers (NC), Mobile/Handheld Television (M/H-TV), Next Generation Handheld Television (NGH-TV), Enhanced Definition Television (EDTV), High Definition Television (HDTV), Fifth Generation Quantum Satellite Multimedia Set-top-boxes (5G-QSMS), Internet of Things (IoT), Cellular Internet of Things (CIoT), Internet of Things Device (IoT-D), Industrial Internet of Things (I-IoT), Industries of the Future Apparatus (IotF-A), Industries of the Future Machine (IotF-M), Automated Teller Machines (ATM), point-of-Sale (POS), other proprietary electronics or apparatus as documented in this patent application of the titled invention "5G-WiFi INSIDE SECURE IRIS BIOMETRICS' LOGIN" Broad-band-technology (BB-T) Automated Iris-biometrics-login Identification System (AHS), supporting Machine-to-Machine (M2M) system-architecture-evolution solution (SAES), providing Global Single-Sign-On (G-SSO) protocols for virtual identifications, replacing multiple passwords, automating identifications with plurality access of global computer network, operable with machine learning algorithm using a particular learning algorithm, and/or technique, control by Artificial Intelligence (AI), and embedded (5G-SoftHSM), embedded into Hardware Security Module (HSM), as cybersecurity software application suite with means to encryption, decryption, upgrade or install encryption for protecting transmitted data associated with 5G-WiFi INSIDE SECURE IRIS BIOMETRICS' LOGIN Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), automating identifications with plurality access of global computer network, accessing web-browser, search-engine, middle-ware, and Operating-System (OS) functionalities across multi-language platforms, via radio waves, and/or optical signals transmitting voice, or video, or video with voice digital signals, sending or receiving interne data, via radio waves, microwave, and/or optical signals. Wherein proprietary branded internet-interoperability ($i_2$) products as documented in this patent application of the titled invention support the technical specifications of the International Organization for Standardization and International Electrotechnical Commission (ISO/IEC).

Wherein the term '$i_2$' is for "internet-Interoperabile" proprietary $i_2$ FOLDER smartphones, proprietary internet-interoperability ($i_2$) non-foldable $i_2$ MINI smartphones, proprietary internet-interoperability ($i_2$) Mobile Equipment (ME), proprietary Cellular Internet-of-Things (CIoT), and/or other apparatus including Mobile Phones (MP), Handheld Devices (HD), User Equipment (UE), Mobile Equipment (ME), Tablet Computers (TC), Laptop Computers (LC), Desktop Computers (DC), Network computers (NC), Mobile/Handheld Television (M/H-TV), Next Generation Handheld Television (NGH-TV), Enhanced Definition Television (EDTV), High Definition Television (HDTV), Fifth Generation Quantum Satellite Multimedia Set-top-boxes (5G-QSMS), Internet of Things (IoT), Cellular Internet of Things (CIoT), Internet of Things Device (IoT-D), Industrial Internet of Things (I-IoT), Industries of the Future Apparatus (IotF-A), Industries of the Future Machine (IotF-M), Automated Teller Machines (ATM), point-of-Sale (POS), other proprietary electronics or apparatus as documented in this patent application of the titled invention "5G-WiFi INSIDE SECURE IRIS BIOMETRICS' LOGIN" Broad-band-technology (BB-T) Automated Iris-biometrics-login Identification System (AIIS), supporting Machine-to-Machine (M2M) system-architecture-evolution solution (SAES),providing Global Single-Sign-On (G-SSO) protocols for virtual identifications, replacing multiple passwords, automating identifications, with machine learning algorithm using a particular learning algorithm, and/or technique, control by Artificial Intelligence (AI), and embedded (5G-SoftHSM) embedded into Hardware Security Module (HSM), operable as cybersecurity software application suite with means to encryption, decryption, upgrade or install encryption for protecting transmitted data associated with 5G-WiFi INSIDE SECURE IRIS BIOMETRICS' LOGIN Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, operable with machine learning algorithm using a particular learning algorithm, and/or technique, control by Artificial Intelligence (AI), automating identifications with plurality access of global computer network, accessing web-browser, search-engine, middle-ware, and Operating-System (OS) functionalities across multi-language platforms, via radio waves, and/or optical signals transmitting voice, or video, or video with voice digital signals, sending or receiving internet data, via radio waves, microwave, and/or optical signals. Wherein proprietary branded internet-interoperability ($i_2$) products as documented in this patent application of the titled invention support the technical specifications of the International Organization for Standardization (ISO).

The term '$i_2$' is for "internet-Interoperabile" proprietary $i_2$ FOLDER smartphones, proprietary internet-interoperability ($i_2$) non-foldable $i_2$ MINI smartphones, proprietary internet-interoperability ($i_2$) Mobile Equipment (ME), proprietary Cellular Internet-of-Things (CIoT), and/or other apparatus including Mobile Phones (MP), Handheld Devices (HD), User Equipment (UE), Mobile Equipment (ME), Tablet Computers (TC), Laptop Computers (LC), Desktop Computers (DC), Network computers (NC), Mobile/Handheld Television (M/H-TV), Next Generation Handheld Television (NGH-TV), Enhanced Definition Television (EDTV), High Definition Television (HDTV), Fifth Generation Quantum Satellite Multimedia Set-top-boxes (5G-QSMS), Internet of Things (IoT), Cellular Internet of Things (CIoT), Internet of Things Device (IoT-D), Industrial Internet of Things (I-IoT), Industries of the Future Apparatus (IotF-A), Industries of the Future Machine (IotF-M), Automated Teller Machines (ATM), point-of-Sale (POS), other proprietary electronics or apparatus as documented in this patent application of the titled invention "5G-WiFi INSIDE SECURE IRIS BIOMETRICS' LOGIN" Broad-band-technology (BB-T) Automated Iris-biometrics-login Identification System (AIIS), supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), and embedded (5G-SoftHSM) embedded into Hardware Security Module (HSM), operable as cybersecurity software application suite with means to encryption, decryption, upgrade or install encryption for protecting transmitted data associated with 5G-WiFi INSIDE SECURE IRIS BIOMETRICS' LOGIN Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), automating identifications with plurality access of global computer network, accessing web-browser, search-engine, middle-ware, and Operating-System (OS) functionalities across multi-language platforms, via radio waves, and/or optical signals transmitting voice, or video, or video with voice digital signals, sending or receiving internet data, via radio waves, microwave, and/or optical signals. Wherein proprietary branded internet-interoperability ($i_2$) products as documented in this patent application of the titled invention support the technical specifications of the International Telecommunication Union Radio sector (ITU-R).

Wherein the term '$i_2$' is for "internet-Interoperabile" proprietary $i_2$ FOLDER smartphones, proprietary internet-interoperability ($i_2$) non-foldable $i_2$ MINI smartphones, proprietary internet-interoperability ($i_2$) Mobile Equipment (ME), proprietary Cellular Internet-of-Things (CIoT), and/or other apparatus including Mobile Phones (MP), Handheld Devices (HD), User Equipment (UE), Mobile Equipment (ME), Tablet Computers (TC), Laptop Computers (LC), Desktop Computers (DC), Network computers (NC), Mobile/Handheld Television (M/H-TV), Next Generation Handheld Television (NGH-TV), Enhanced Definition Television (EDTV), High Definition Television (HDTV), Fifth Generation Quantum Satellite Multimedia Set-top-boxes (5G-QSMS), Internet of Things (IoT), Cellular Internet of Things (CIoT), Internet of Things Device (IoT-D), Industrial Internet of Things (I-IoT), Industries of the Future Apparatus (IotF-A), Industries of the Future Machine (IotF-M), Automated Teller Machines (ATM), point-of-Sale (POS), other proprietary electronics or apparatus as documented in this patent application of the titled invention "5G-WiFi INSIDE SECURE IRIS BIOMETRICS' LOGIN" Broad-band-technology (BB-T) Automated Iris-biometrics-login Identification System (AIIS), as a Convolutional Neural Network (CNN) supporting Machine-to-Machine (M2M) system-architecture-evolution solution (SAES),providing Global Single-Sign-On (G-SSO) protocols for virtual identifications, replacing multiple passwords, automating identifications, with machine learning algorithm using a particular learning algorithm, and/or technique, control by Artificial Intelligence (AI), and embedded (5G-SoftHSM) embedded into Hardware Security Module (HSM), operable as cybersecurity software application suite with means to encryption, decryption, upgrade or install encryption for protecting transmitted data associated with 5G-WiFi INSIDE SECURE IRIS BIOMETRICS' LOGIN Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), automating identifications with plurality access of global computer network, accessing web-browser, search-engine, middle-ware, and Operating-System (OS) functionalities across multi-language platforms, via radio waves, and/or optical signals transmitting voice, or video, or video with voice digital signals, sending or receiving interne data, via radio waves, microwave, and/or optical signals. Wherein proprietary branded internet-interoperability ($i_2$) products as documented in this patent application of the titled invention support the technical specifications of Air Traffic Services Communication (ATSC).

The term '$i_2$' is for "internet-Interoperabile" proprietary $i_2$ FOLDER smartphones, proprietary internet-interoperability ($i_2$) non-foldable $i_2$ MINI smartphones, proprietary internet-interoperability ($i_2$) Mobile Equipment (ME), proprietary Cellular Internet-of-Things (CIoT), and/or other apparatus including Mobile Phones (MP), Handheld Devices (HD), User Equipment (UE), Mobile Equipment (ME), Tablet Computers (TC), Laptop Computers (LC), Desktop Computers (DC), Network computers (NC), Mobile/Handheld Television (M/H-TV), Next Generation Handheld Television (NGH-TV), Enhanced Definition Television (EDTV), High Definition Television (HDTV), Fifth Generation Quantum Satellite Multimedia Set-top-boxes (5G-QSMS), Internet of Things (IoT), Cellular Internet of Things (CIoT), Internet of Things Device (IoT-D), Industrial Internet of Things (I-IoT), Industries of the Future Apparatus (IotF-A), Industries of the Future Machine (IotF-M), Automated Teller Machines (ATM), point-of-Sale (POS), other proprietary electronics or apparatus as documented in this patent application of the titled invention "5G-WiFi INSIDE SECURE IRIS BIOMETRICS' LOGIN" Broad-band-technology (BB-T) Automated Iris-biometrics-login Identification System (AIIS), supporting Machine-to-Machine (M2M) system-architecture-evolution solution (SAES), providing Global Single-Sign-On (G-SSO) providing Global Single-Sign-On (G-SSO) protocols for virtual identifications, replacing multiple passwords, automating identifications, with machine learning algorithm using a particular learning algorithm, and/or technique, control by Artificial Intelligence (AI), and embedded (5G-SoftHSM) embedded into Hardware Security Module (HSM), as cybersecurity software application suite with means to encryption, decryption, upgrade or install encryption for protecting transmitted data associated with 5G-WiFi INSIDE SECURE IRIS BIOMETRICS' LOGIN Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm operable with a particular learning algorithm, and/or technique, control by Artificial Intelligence (AI), automating identifications with plurality access of global computer network, accessing web-browser, search-engine, middle-ware, and Operating-System (OS) functionalities across multi-language platforms, via radio waves, and/or optical signals transmitting voice, or video, or video with voice digital signals, sending or receiving internet data, via radio waves, microwave, and/or optical signals. Wherein proprietary branded internet-interoperability ($i_2$) products as documented in this patent application of the titled invention support the technical specifications of Internet-Engineering-Task-Force (IETF).

Wherein the term '$i_2$' is for "internet-Interoperabile" proprietary $i_2$ FOLDER smartphones, proprietary internet-interoperability ($i_2$) non-foldable $i_2$ MINI smartphones, proprietary internet-interoperability ($i_2$) Mobile Equipment (ME), proprietary Cellular Internet-of-Things (CIoT), and/or other apparatus including Mobile Phones (MP), Handheld Devices (HD), User Equipment (UE), Mobile Equipment (ME), Tablet Computers (TC), Laptop Computers (LC), Desktop Computers (DC), Network computers (NC), Mobile/Handheld Television (M/H-TV), Next Generation Handheld Television (NGH-TV), Enhanced Definition Television (EDTV), High Definition Television (HDTV), Fifth Generation Quantum Satellite Multimedia Set-top-boxes (5G-QSMS), Internet of Things (IoT), Cellular Internet of Things (CIoT), Internet of Things Device (IoT-D), Industrial Internet of Things (I-IoT), Industries of the Future Apparatus (IotF-A), Industries of the Future Machine (IotF-M), Automated Teller Machines (ATM), point-of-Sale (POS), other proprietary electronics or apparatus as documented in this patent application of the titled invention "5G-WiFi INSIDE SECURE IRIS BIOMETRICS' LOGIN" Broad-band-technology (BB-T) Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), and (5G-SoftHSM) embedded into Hardware Security Module (HSM), as cybersecurity software application suite with means to encryption, decryption, upgrade or install encryption for protecting transmitted data associated with 5G-WiFi INSIDE SECURE IRIS BIOMETRICS' LOGIN Automated Iris-biometrics-login Identification System (AIIS) as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), automating identifications with plurality access of global computer network, accessing web-browser, search-engine, middle-ware, and Operating-System (OS) functionalities across multi-language platforms, via radio waves, and/or optical signals transmitting voice, or video, or video with voice digital signals, sending or receiving interne data, via radio waves, microwave, and/or optical signals. Wherein proprietary branded internet-interoperability ($i_2$) products as documented in this patent application of the titled invention support the technical specifications endorsed by European Telecommunications Standards Institute (ETSI), and 3rd Generation Partnership Project (3GPP).

The term '$i_2$' is for "internet-Interoperabile" proprietary 12 FOLDER smartphones, proprietary internet-interoperability (ix) non-foldable $i_2$ MINI smartphones, proprietary internet-interoperability ($i_2$) Mobile Equipment (ME), proprietary Cellular Internet-of-Things (CIoT), and/or other apparatus including Mobile Phones (MP), Handheld Devices (HD), User Equipment (UE), Mobile Equipment (ME), Tablet Computers (TC), Laptop Computers (LC), Desktop Computers (DC), Network computers (NC), Mobile/Handheld Television (M/H-TV), Next Generation Handheld Television (NGH-TV), Enhanced Definition Television (EDTV), High Definition Television (HDTV), Fifth Generation Quantum Satellite Multimedia Set-top-boxes (5G-QSMS), Internet of Things (IoT), Cellular Internet of Things (CIoT), Internet of Things Device (IoT-D), Industrial Internet of Things (I-IoT), Industries of the Future Apparatus (IotF-A), Industries of the Future Machine (IotF-M), Automated Teller Machines (ATM), point-of-Sale (POS), other proprietary electronics or apparatus as documented in this patent application of the titled invention "5G-WiFi INSIDE SECURE IRIS BIOMETRICS' LOGIN" Broad-band-technology (BB-T) Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), operable as (5G-SoftHSM) embedded into Hardware Security Module (HSM), as cybersecurity software application suite with means to encryption, decryption, upgrade or install encryption for protecting transmitted data associated with G-WiFi INSIDE SECURE IRIS BIOMETRICS' LOGIN Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), automating identifications with plurality access of global computer network, accessing web-browser, search-engine, middle-ware, and Operating-System (OS) functionalities across multi-language platforms, via radio waves, and/or optical signals transmitting voice, or video, or video with voice digital signals, sending or receiving internet data, via radio waves, microwave, and/or optical signals. Wherein proprietary branded internet-interoperabilit ($i_2$) products as documented in this patent application of the titled invention support the technical specifications of the Institute of Electrical and Electronics Engineers (IEEE).

Wherein the term '$i_2$' is for "internet-Interoperabile" proprietary 12 FOLDER smartphones, proprietary internet-interoperability ($i_2$) non-foldable $i_2$ MINI smartphones, proprietary internet-interoperability ($i_2$) Mobile Equipment (ME), proprietary Cellular Internet-of-Things (CIoT), and/or other apparatus including Mobile Phones (MP), Handheld Devices (HD), User Equipment (UE), Mobile Equipment (ME), Tablet Computers (TC), Laptop Computers (LC), Desktop Computers (DC), Network computers (NC), Mobile/Handheld Television (M/H-TV), Next Generation Handheld Television (NGH-TV), Enhanced Definition Television (EDTV), High Definition Television (HDTV), Fifth Generation Quantum Satellite Multimedia Set-top-boxes (5G-QSMS), Internet of Things (IoT), Cellular Internet of Things (CIoT), Internet of Things Device (IoT-D), Industrial Internet of Things (I-IoT), Industries of the Future Apparatus (IotF-A), Industries of the Future Machine (IotF-M), Automated Teller Machines (ATM), point-of-Sale (POS), other proprietary electronics or apparatus as documented in this patent application of the titled invention "5G-WiFi INSIDE SECURE IRIS BIOMETRICS' LOGIN" Broad-band-technology (BB-T) Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), and embedded (5G-SoftHSM) embedded into Hardware Security Module (HSM), as cybersecurity software application suite with means to encryption, decryption, upgrade or install encryption for protecting transmitted data associated with 5G-WiFi INSIDE SECURE IRIS BIOMETRICS' LOGIN Automated Iris-biometrics-login Identification System (AIIS) as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), automating identifications with plurality access of global computer network, accessing web-browser, search-engine, middle-ware, and Operating-System (OS) functionalities across multi-language platforms, via radio waves, and/or optical signals transmitting voice, or video, or video with voice digital signals, sending or receiving interne data, via radio waves, microwave, and/or optical signals. Wherein proprietary branded internet-interoperability ($i_2$) products as documented in this patent application of the titled invention support the technical specifications of the Institute of Electrical and Electronics Engineers (IEEE).

The term '$i_2$' is for "internet-Interoperabile" proprietary $i_2$ FOLDER smartphones, proprietary internet-interoperability ($i_2$) non-foldable $i_2$ MINI smartphones, proprietary internet-interoperability ($i_2$) Mobile Equipment (ME), proprietary Cellular Internet-of-Things (CIoT), and/or other apparatus including Mobile Phones (MP), Handheld Devices (HD), User Equipment (UE), Mobile Equipment (ME), Tablet Computers (TC), Laptop Computers (LC), Desktop Computers (DC), Network computers (NC), Mobile/Handheld Television (M/H-TV), Next Generation Handheld Television (NGH-TV), Enhanced Definition Television (EDTV), High Definition Television (HDTV), Fifth Generation Quantum Satellite Multimedia Set-top-boxes (5G-QSMS), Internet of Things (IoT), Cellular Internet of Things (CIoT), Internet of Things Device (IoT-D), Industrial Internet of Things (I-IoT), Industries of the Future Apparatus (IotF-A), Industries of the Future Machine (IotF-M), Automated Teller Machines (ATM), point-of-Sale (POS), other proprietary electronics or apparatus as documented in this patent application of the titled invention 5G-WiFi INSIDE SECURE IRIS BIOMETRICS' LOGIN Broad-band-technology (BB-T) Automated Iris-biometrics-login Identification System (AIIS)as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), Fifth Generation Software Hardware Security Module (5G-SoftHSM) embedded into Hardware Security Module (HSM), operable as cybersecurity software application suite with means to encryption, decryption, upgrade or install encryption for protecting transmitted data associated with 5G-WiFi INSIDE SECURE IRIS BIOMETRICS' LOGIN Automated Iris-biometrics-login Identification System (AIIS) as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), automating identifications with plurality access of global computer network, accessing web-browser, search-engine, middle-ware, and Operating-System (OS) functionalities across multi-language platforms, via radio waves, and/or optical signals transmitting voice, or video, or video with voice digital signals, sending or receiving internet data, via radio waves, microwave, and/or optical signals. Wherein proprietary branded internet-interoperability ($i_2$) products as documented in this patent application of the titled invention support the technical specifications of the Society of Motion Pictures and Television Engineer (SMPTE).

Biometric originates from Greek words bio (life) and metric (to measure). Wherein the term biometric has been used since 20th century as reference to mathematical data analysis in biosciences.

The term iris comes from the Greek goddess of the rainbow, because of the many colors of the iris. Iris is responsible for the eyes' color.

Biometric of the iris is considered highly accurate, and there is no known case of false acceptance.

The iris patterns remain stable, glasses, contact lenses, and even eye surgery does not change its characteristics.

Iris Biometric segmentation to template security idea of using iris pattern for identification was born with Frank Burch 1936.

Identification systems are deployed to determine whether an individuals' biometric data exists more than once in a database.

Biometric is the science of identifying, or verifying the identity of persons based on physical, or behavioral characteristics.

Market reports and industry projection are that biometric development will be a primary growth sector in social media, also smartphones applications in the next decade.

Biometric authentication refers to the automatic virtual identifications, or identity verification using physiological, and/or behavioral characteristics.

Identification tends to be the more difficult task as the system must perform the search on a database of enrolled users to find a match (a one-to-many search).

Verification is defined as that of determining whether two samples of biometrics correspond to, or were generated by the same individual, or by different individuals.

Biometric technology is one of the modern world's phenomena which can be justified by the strong need for increased security.

The primary application focus of biometric technology is the verification and identification of humans using their possessed biological properties.

Biometric identification provides a valid alternative to traditional authentication mechanisms such as ID cards and passwords.

Multi-modal biometric systems utilize more than one physiological, or behavioral characteristics for enrollment, verification, and/or identification.

Biometric lock feature is considered a more convenient way to unlock devices than entering numeric/or alphanumeric pass-code, and as a more secure way to protect content stored on devices.

Human identification with biometric can be regarded as a pattern recognition, to create digital signature.

Biometric will become more relevant due to the rapid growth in mobile devices and social-media for user authentication on mobile platform.

Iris recognition is a biometric system used to reliably identify a person by analyzing the patterns found in the iris.

The iris begins to form in the third month of gestation and the structures creating its patterns are largely complete by the eighth month.

Iris remains constant from the age of one, a child iris scanned at this age would be the same with no deviation for a lifetime.

The iris has the great mathematical advantage that its pattern variability among different persons are enormous.

Iris recognition use noninvasive method for acquiring images, there is no need to touch any equipment that has recently been touch by a stranger.

Iris-biometric is a reliable form of identification because of the uniqueness of iris-patterns.

Massive use of internet and electronic devices greatly requires and depends on security, as people become more active in cyberworld.

With worldwide popularity of smartphones, users start storing more sensitive, and private data on phones thereof, users' authentication has become very crucial.

Verifying identity is becoming increasingly important as computer transaction replaces personal transaction.

Biometric Systems can prevent theft of data, and limit physical access. Personal identification numbers (PIN) do not provide as much security against theft, as biometric security.

Biometric technology is more secure because it is based on a physical trait that only one individual possesses. Financial transaction can be ordered from ATM or PCs from remote locations, because biometric adds security to reduce fraud.

Biometric system is more comfortable for taking out money from ATM without cards, safer, and faster eliminating secret codes, and/or cards.

Features of biometric are hard to replace, forget or share, they are considered safer for recognizing people than classic codes, and/or ID-cards.

Biometric is becoming an essential factor in the effective identification of people because biometric features cannot be shared. or be stolen.

Whenever biometrics pattern recognition technology is used correctly it make society safer, by reducing fraud.

Concerns about security and identity fraud, have created the need to use biometric methods in applications, other than forensic applications.

Sensitive data can more readily be made available on protected network than on one protected by passwords.

Biometric greatly simplify authentication process, replacing multiple passwords, reducing the burden on both users and system administrators.

The use of biometrics provides greater security than traditional authentication methods, increasing accuracy, and ease making biometric an increasingly feasible solution for securing computer and network.

Without biometric persons may register multiple identities, and there is no way to be certain a person is not registered under multiple identities within a system, therefore in the absence of biometrics, there is no efficient way of identifying duplicate applicants within a system, and it is therefore difficult to deter such applicants.

In the near distance, perhaps using biometrics within everyday process will be as familiar to us as using a plastic card is today.

Iris recognition is harder to circumvent than fingerprint, and provides high levels of accuracy, human iris has been discovered as one of the most reliable biometric characteristics, where in the left and right irises of the same person are unique.

Detecting both the periocular and iris-biometric, and fusing them together result in powerful recognition, enhancing usability of iris recognition.

The iris has proven to have high universality, particularity and permanence.

Iris recognition is one of the most effectively biometric techniques used for security purposes.

Iris-biometric is believed to be one of the hardest biometrics to spoof and circumvent.

Original biometric iris pattern cannot be recreated from template data.

Permanence over time makes iris recognition a reliable biometric, compared to other physiological characteristics. It is difficult to tamper iris texture data, and it is possible to detect an artificial iris.

During fetal development, the eye goes through a process called chaotic morphogenesis that gives each iris its unique appearance.

Texture of the iris is made up of a complex fibrous and elastic structure sometimes referred to as the trabecular mesh-work.

Iris provides uniqueness of patterns throughout life, and is an attractive biometric system for identifying individual and twins.

Iris patterns remain relatively unchanged throughout a person's lifetime, the patterns are formed third month of gestation and becomes stable around the eighth month.

Iris recognition stability, and iris-biometric templates longevity allows a single enrollment to final a lifetime.

Iris technology has proven to be accurate, and fast when images have high resolution and had been captured well.

The left iris, and the right of an individual exhibit significant differences in their textures although some global similarities may be observed.

The iris is rarely affected by external elements because it is well-protected behind the cornea.

Eye surgery, performed on the cornea, or on the retina through the pupil seldom hurts the iris.

An iris imaging is relatively non-intrusive, and requires minimum effort from a subject, with no physical contact.

Small intra-class variations and large inter-class variations make iris recognition a highly desirable biometric identification.

Biometric can be an effective, reliable, cost efficient way to protect confidential data; private and public-sector business can benefit.

Usable characteristics for iris-recognition, pattern textures are most distinguishable among different people.

Iris recognition has higher accuracy and less likelihood of false positive.

The stable physical traits of iris-technology are safe, fast, and most accurate, noninvasive biometric.

Biometric authentication can replace the use of passcodes, this offers convenience, as users no longer need to remember a pass-code.

The invention "5G-WiFi INSIDE SECURE IRIS BIOMETRICS' LOGIN" Broad-band-technology (BB-T) Automated Iris-biometrics-login Identification System (AIIS), as a Convolutional Neural Network (CNN) supporting Machine-to-Machine (M2M) system-architecture-evolution solution (SAES), operable as downloadable or embedded as Fifth Generation Software Hardware Security Module (5G-SoftHSM) embedded into Hardware Security Module (HSM), as cybersecurity software application suite with means to encryption, decryption, upgrade or install encryption for protecting transmitted data associated with 5G-WiFi INSIDE SECURE IRIS BIOMETRICS' LOGIN Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), supporting a plurality of broadcast television, and/or Digital Terrestrial Television (DTT)including:

- Advanced Television Systems Committee (ATSC)
- Advanced Television Systems Committee-Mobile/Handheld (ATSC-MH)
- Integrated Services Digital Broadcasting Satellite (ISDB-S)
- Integrated Services Digital Broadcasting International (ISDB-T)/Sistema Brasileiro de Televisão Digital (SBTVD)
- Digital Video Broadcasting-Satellite (DVB-S)
- Digital Video Broadcasting-Satellite services to Handhelds (DVB-SH)
- Digital Video Broadcasting-Handheld (DVB-H)
- Digital Video Broadcasting-Satellite services to Handheld (DVB-SH)
- Digital Terrestrial Multimedia Broadcast (DTMB)
- Integrated Services Digital Broadcasting-Satellite (ISDB-S)

Wherein Digital Video Broadcasting-Satellite services to Handhelds (DVB-SH) is a mobile-TV formats for delivering Internet-Protocol (IP) based media content and data to handheld terminals such as mobile phones, and/or mobile devices, based on a hybrid Satellite/terrestrial downlink, and using General Packet Radio Service (GPRS) for uplink.

Digital Video Broadcasting-Next Generation Handheld (DVB-NGH) is a mobile-TV formats for bringing broadcast services to mobile handsets.

BRIEF SUMMARY OF THE INVENTION

The invention's title "5G-WiFi INSIDE SECURE IRIS BIOMETRICS' LOGIN" is a combination of two proprietary marks. Wherein the term "5G-WiFi INSIDE" and "SECURE IRIS BIOMETRICS' LOGIN". Wherein "5G-WiFi" is an acronym formed as an abbreviated form of the wording: "Fifth Generation Wireless Freespace internet-connectivity".

The abbreviations presented in this document are applied as represented in the science of technological with the same definitions (meaning), while the unfamiliar terms are proprietary terms, representing the definitions as presented in this invention "5G-WiFi INSIDE SECURE IRIS BIOMETRICS' LOGIN"

Wherein the invention "5G-WiFi INSIDE SECURE IRIS BIOMETRICS' LOGIN" Broad-band-technology (BB-T) Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), operable as Fifth Generation Information Technology (5G-IT) cybersecurity application suite, for embedding, and/or downloadable as Fifth Generation Software Hardware Security Module (5G-SoftHSM) embedded into embedded into Hardware Security Module (HSM).

BRIEF DESCRIPTION OF THE DRAWINGS

Embodiment's of the present invention 5G-WiFi INSIDE SECURE IRIS BIOMETRICS' LOGIN illustrated drawings presented are examples, and are not limited to the figures of the accompanying drawings, in which like references may indicate similar elements. Wherein brief description of each drawing, base on the numbered figures as depicted in the patent application drawings are set forth in the subsequent paragraphs.

FIG. 24 depicts a proprietary logo embossed around casting operable as a shield for protecting external view finder (eyepiece) of proprietary foldable internet-interoperability $i_2$ FOLDER smartphones, and proprietary non-foldable internet-interoperability $i_2$ MINI smartphones.

FIG. 25 depicts a set of proprietary internet-interoperability ($i_2$) Internet Protocol (IP) autofocus camera(s)/$i_2$IP autofocus camera(s).

DETAILED DESCRIPTION OF THE INVENTION

Figure 8:
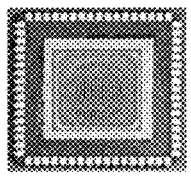
FIG. 8 depicts a proprietary internet-interoperability ($i_2$) wireless modem for embedding as secure element soldered into proprietary internet-interoperability ($i_2$) Central-Processing Units (CPU).

The terminology used herein is for the purpose of describing specific embodiment, and is not intended to be limiting of the invention 5G-WiFi INSIDE SECURE IRIS BIOMETRICS' LOGIN, as used herein. The terms "and/or" includes any or all combinations of one or more of the associated listed items. Singular forms "a," "an," and "the" are intended to include the plural forms as well as the singular form unless the context clearly indicates otherwise.

Wherein it must be further understood that the terms "comprise" and/or "comprising," when used in this specification, specify the presence of stated features, steps, operations, elements, and/or components, but do not preclude additional features, steps, operations, elements, components, and/or groups thereof. Unless otherwise defined, all terms (including technical and scientific terms) used herein have the same meaning as commonly understood by one having ordinary skill in the art to which this invention 5G-WiFi INSIDE SECURE IRIS BIOMETRICS' LOGIN belongs.

It must be further understood that terms used are same as those defined in commonly used dictionaries, and must be interpreted as having similar meaning that is consistent with the meaning in the context of the relevant art, and must not be interpreted in an idealized, or overly formal sense unless expressly so defined herein.

In describing the invention 5G-WiFi INSIDE SECURE IRIS BIOMETRICS' LOGIN, it must be understood that relevant techniques and steps are disclosed. Each of these has individual benefit and each can also be used in conjunction with one, or more, and/or in some cases all, of the other disclosed processes.

Wherein for the sake of clarity will refrain from repeating every possible combination of the individual steps in an unnecessary fashion. Nevertheless, the specification and claims should be read with the understanding that such combinations are entirely within the scope of the invention 5G-WiFi INSIDE SECURE IRIS BIOMETRICS' LOGIN, and the claims.

In the following description, for purposes of explanation, numerous specific details are set forth in order to provide a thorough understanding of the present invention 5G-WiFi INSIDE SECURE IRIS BIOMETRICS' LOGIN.

The present disclosure of the invention 5G-WiFi INSIDE SECURE IRIS BIOMETRICS' LOGIN must be considered as an exemplification of the invention and is not intended to limit the invention to the specific embodiment as illustrated by the figures, or descriptions below.

The invention 5G-WiFi INSIDE SECURE IRIS BIOMETRICS' LOGIN combines technologies from several fields including, computer vision (CV), pattern recognition, statistical interference, application, software, electronics, and optics.

Wherein the invention 5G-WiFi INSIDE SECURE IRIS BIOMETRICS' LOGIN is application using artificial intelligence (AI) with detail of AI-systems to control data bearing records and methods powering proprietary central-processing units (CPU) with embedded Internet-Interoperability ($i_2$) wireless modem soldered onto motherboard as secure element into Central Processing Units (CPU).

This invention primary use is a secure lifetime iris-biometrics login virtual-identifications, usable across multiple devices, and platform, as a contact-free, naturally convenient, and technically efficient identification mechanism, in lieu of physically required identifications, for authentication to access public machines such as Automated Teller Machines (ATM), self-check-in machines, self-checkout machines, self-serve machines, unlocking personal smart devices, disabling personal smart devices if stolen, securing data stored on smart devices, replacing multiple passwords login to social media and/or websites, allowing single sign-on login to access third-party sites supporting 5G-WiFi INSIDE SECURE IRIS BIOMETRICS' LOGIN.

Wherein the invention 5G-WiFi INSIDE SECURE IRIS BIOMETRICS' LOGIN is cloud-based end-user applications, using different networks, for transaction, for authentication, and cloud base specially adapted cybersecure applications.

This invention 5G-WiFi INSIDE SECURE IRIS BIOMETRICS' LOGIN is an all-inclusive, hybrid multi-lingual, multi-modal biometric technology in verification, virtual identifications, classification, authentication, and authorization of users.

The invention 5G-WiFi INSIDE SECURE IRIS BIOMETRICS' LOGIN facilitates the enrolling iris biometric of both eyes' iris, allowing the end-user to use iris-biometric from either eye's iris. Wherein the invention 5G-WiFi INSIDE SECURE IRIS BIOMETRICS' LOGIN uses a multi-acquisition process, namely, facial image acquisition including eyes, or periocular region of face including eyes (used whenever an enrolling user is wearing a helmet, a mask, a religious veil, or a face occlusion hair style), in the preprocessing for the feature extraction of the iris-biometric to guard against spoofing, and to ensure iris is of a living being, and not from a deceased, in low light the pupil will dilate but constrict in bright light.

This invention 5G-WiFi INSIDE SECURE IRIS BIOMETRICS' LOGIN methods include capturing iris plus pupil before extraction data, and compiling reference-templates.

Wherein the invention 5G-WiFi INSIDE SECURE IRIS BIOMETRICS' LOGIN uses biometric data input to generate, archive, and manage autonomous iris-biometrics' login virtual identifications, replacing multiple passwords, allowing individual Global Single-Sign-On (G-SSO), protocols for virtual identifications, replacing multiple passwords, automating identifications with plurality access of global computer network, accessing web-browser, search-engine, middle-ware, and Operating-System (OS) functionalities across multi-language platforms.

The invention 5G-WiFi INSIDE SECURE IRIS BIOMETRICS' LOGIN data process involves the use of digitally coded reference templates containing virtual identifications, compiled using biometric data paired to country specific national identification number, or national passport number, or drivers license number granted in domicile country for authentication.

Data obtained from biometric sensors, either directly, or after further processing are utilized as biometric samples.

Biometric sample, or combination of biometric samples suitable for storage are stored in database for future references as biometric templates.

The invention 5G-WiFi INSIDE SECURE IRIS BIOMETRICS' LOGIN uses matching as a comparison of biometric templates to determine the degree of similarity, and or correlation, using templates (small file derived from the distinctive features of the biometric data of each enrollee which are used to perform biometric matches).

Wherein this 5G-WiFi INSIDE SECURE IRIS BIOMETRICS' LOGIN invention uses capturing iris-at-a-distance (near-distance, or far-distance), plus adding voice recognition to facilitate the visually impaired and/or others, for recognition of special voice characteristics for use in authentication.

The invention5G-WiFi INSIDE SECURE IRIS BIOMETRICS' LOGIN also facilitates signature biometric, and electronic signature (e-signature) for electronic signing of documents, also pairing prior biometric modality embedded, or downloaded as software application onto personal devices, and/or public machines with 5G-WiFi INSIDE SECURE IRIS BIOMETRICS' LOGIN, to give the end-user as an alternate system.

Wherein the invention 5G-WiFi INSIDE SECURE IRIS BIOMETRICS' LOGIN new enrolling user are accorded the optional benefit of using country specific national identification number, national passport number, or drivers license number granted in domicile country in lieu of username with 5G-WiFi INSIDE SECURE IRIS BIOMETRICS' LOGIN data for registration, and future authentication when using public machines such as ATM, self-check-in machines, self-checkout machines, and self-serve machines.

The invention 5G-WiFi INSIDE SECURE IRIS BIOMETRICS' LOGIN systems provide special services, or facilities to subscribers, including application servers' systems providing special services to telephonic subscribers.

This invention uses methods culminating with an algorithm finite number of steps to generate 5G-WiFi INSIDE SECURE IRIS BIOMETRICS' LOGIN identification paired to subscribers, users, and/or client a.k.a members' country specific national identification number, national passport number, or drivers license number granted in domicile country, for use as hybrid software suite, by means of web browser, search engine, middleware, Operating System (OS) functionalities, and software applications, as cybersecure application suite specially adapted for specific applications, namely, telephonic applications, e-commerce and shopping applications, email applications, social media applications, web applications, pictorial communication applications, avionics applications, automotive applications, financial service applications, sporting applications, biomedical applications, emergency applications, event bookings applications, hospitals and health facilities applications, educational institutions applications, airline bookings applications, leisure and hospitality applications, as peer-to-peer/peer-2-peer (P2P), business-to-peer/business-2-peer (B2P), and business-to-business/business-2—business (B2B) platforms, sharing similar user interface, and exchanging security data across multiple devices, as mobile applications, web applications, and cloud base artificial intelligence (AI) software.

Wherein 5G-WiFi INSIDE SECURE IRIS BIOMETRICS' LOGIN invention for distribution as software pushdown or pull-down, and/or distributed as downloadable app from proprietary $i_2$ App Bank, Apple Store, Google play, or other downloadable app source, or the World Wide Web (web), or install as embedded Software Hardware Fifth Generation Software Hardware Security Module (5G-SoftHSM) embedded into Hardware Security Module (HSM), and/or into proprietary central-processing units (CPU) with embedded Internet-Interoperability ($i_2$) wireless modem soldered onto motherboard as secure element into Central Processing Units (CPU), processors, and/or microprocessors installed electronics of web-servers, proprietary internet-interoperability $i_2$ FOLDER smartphones, proprietary internet-interoperability non-foldable $i_2$ MINI smartphones, proprietary internet-interoperability (h) Mobile Equipment (ME), proprietary Cellular Internet-of-Things (CIoT), and/or other apparatus including Mobile Phones (MP), Handheld Devices (HD), User Equipment (UE), Mobile Equipment (ME), Tablet Computers (TC), Laptop Computers (LC), Desktop Computers (DC), Network computers (NC), Mobile/Handheld Television (M/H-TV), Next Generation Handheld Television (NGH-TV), Enhanced Definition Television (EDTV), High Definition Television (HDTV), Fifth Generation Quantum Satellite Multimedia Set-top-boxes (5G-QSMS), Internet-of-Things (IoT),Cellular Internet-of-Things (CIoT), Internet of Things Device (IoT-D), Industrial Internet of Things (I-IoT), Industries of the Future Apparatus (IotF-A), Industries of the Future Machine (IotF-M), Automated Teller Machines (ATM), point-of-Sale (POS) apparatus, Hybrid electric vehicles (HEV), smart-vehicles, autonomous vehicles (self-driving cars), other smart devices or apparatus, and add-on applications for supporting the use of external additional devices, namely, dongles, smart cards, SIM cards, trusted platform module [TPM], USB or hardware security module, in addition to add-on applications interfacing with devices' Operating System (OS), or other system applications, and hardware, namely, embedded camera, optical biometric-sensor, and/or peripheral devices used to input data to devices, or output data from devices.

The invention 5G-WiFi INSIDE SECURE IRIS BIOMETRICS' LOGIN facilitates sending and receiving data, musical libraries, photos, videos, documents, multilingual files, MIDI-like files, or data streams, and e-mail, via, 5G-WiFi INSIDE SECURE IRIS BIOMETRICS' LOGIN, satellite-communication networks, the interne, Bluetooth, wireless communication networks, mobile phone system, computer system, satellite communication system, Local area network (LAN), wide area networks (WAN), optical spectrum, broadband spectrum, Broadband local area networks, and optical fiber transmission.

The invention 5G-WiFi INSIDE SECURE IRIS BIOMETRICS' LOGIN supports video games including gaming systems which provides financial rewards.

Wherein the invention 5G-WiFi INSIDE SECURE IRIS BIOMETRICS' LOGIN supports applications of flexible displays.

The invention 5G-WiFi INSIDE SECURE IRIS BIOMETRICS' LOGIN operates in two authentication modes, namely, verification mode, and identification mode. In an event that a user's live biometric sample when presented for verification returns an image reject (IR), the system automatically switches to identification mode to search to identify if a matching reference-template is stored in the system database.

Wherein the invention 5G-WiFi INSIDE SECURE IRIS BIOMETRICS' LOGIN verification mode system confirms or denies claimed identity comparing captured biometric with biometric templates stored. In identification mode, the system recognizes an individual by searching templates of all users in a database for a match.

The invention 5G-WiFi INSIDE SECURE IRIS BIOMETRICS' LOGIN verification possible result include image reject (IR) when biometric target is present, but no acceptable image detected, false positive (FP) exist when biometric incorrectly match the stored biometric template, true positive (TP) exist when biometric correctly match the stored biometric, true negative (TN) exist when biometric correctly fails to match the stored biometric, false negative (FN) exist when biometric incorrectly fails to match the stored biometrics.

The invention 5G-WiFi INSIDE SECURE IRIS BIOMETRICS' LOGIN operates as a standalone, and/or a multi-modal biometric identification technique, pairing prior biometric modality embedded, or downloaded as software application onto personal devices.

Wherein the invention 5G-WiFi INSIDE SECURE IRIS BIOMETRICS' LOGIN gives the end-users additional options by pairing prior biometric modality embedded, or downloaded as software application onto personal device(s), or public machines with 5G-WiFi INSIDE SECURE IRIS BIOMETRICS' LOGIN.

The invention 5G-WiFi INSIDE SECURE IRIS BIOMETRICS' LOGIN is used as a solution to secure personal data stored on mobile devices, and by doing so, sensitive data accessed via mobile interne is secure.

The invention 5G-WiFi INSIDE SECURE IRIS BIOMETRICS' LOGIN allows sensitive data to be more readily offered on a protected network.

Wherein the invention 5G-WiFi INSIDE SECURE IRIS BIOMETRICS' LOGIN matches generated iris-biometrics' login virtual identifications with Internet Protocol (IP) address to unlock smartphones, and other smart devices.

The invention 5G-WiFi INSIDE SECURE IRIS BIOMETRICS' LOGIN simplifies subscribers, users, and/or client a.k.a members' authentication process replacing multiple passwords, providing global Single-Sign-On (SSO), for applications accessible by multiple resources.

Wherein 5G-WiFi INSIDE SECURE IRIS BIOMETRICS' LOGIN invention application is used for security, convenience, and for fraud reduction.

The invention 5G-WiFi INSIDE SECURE IRIS BIOMETRICS' LOGIN is a modality for single sign-on permitting an active logon using an existing 5G-WiFi INSIDE SECURE IRIS BIOMETRICS' LOGIN to access third-party sites supporting 5G-WiFi INSIDE SECURE IRIS BIOMETRICS' LOGIN.

The invention 5G-WiFi INSIDE SECURE IRIS BIOMETRICS' LOGIN is a naturally convenient, and technically efficient identification mechanism in lieu of physically required identifications, for authentication.

Wherein the invention 5G-WiFi INSIDE SECURE IRIS BIOMETRICS' LOGIN supports vehicular key-less entry access, vehicular and key-less ignition switch.

The benefits of the invention 5G-WiFi INSIDE SECURE IRIS BIOMETRICS' LOGIN are numerous. Wherein some benefits of the present invention 5G-WiFi INSIDE SECURE IRIS BIOMETRICS' LOGIN are now being highlighted as follows:

- guaranteed secure lifetime 5G-WiFi INSIDE SECURE IRIS BIOMETRICS' LOGIN identifications, usable across multiple devices and platforms
- guaranteed safe, secure login at all-times
- a safeguard against identity theft
- a safeguard against accessibility of data stored on personal devices by others
- a safeguard against fraudulent accessibility of automatic teller machines (ATM)
- securing user authentication and verification, user identity or authorization, and access security to prevent unauthorized access of ATM
- safeguarding users and customers of automated teller machines (ATM) and point-of-Sale (POS) machines from fraudsters, using skimming devices which records data from customers' bank cards, and credit cards, and using the data later to withdraw cash from user account
- an unmatched, safe, and secure alternative to fingerprint login at times of epidemics and/or pandemic outbreak of virus transmitted by fingers (touch)
- a safe, secure digital payment method in lieu of cash payment especially at times of epidemic and/or pandemic outbreak of virus, wherein the virus could also be transmitted, via banknotes
- social distancing, and rapid verification of iris-biometric
- a safe, secure login to unlock personal-devices, and public-machines
- guaranteed confidentiality and safe cybersecure, where data is protected from unauthorized access
- key-less vehicular access, and ignition switch on
- a cost-effective biometric mechanism
- the greatest level of biometric-security in comparable to other biometric-security type
- a high accuracy rate, wherein there is no known case of false acceptance
- a stable biometric accuracy-record, wherein glasses, contact lenses, and/or eye surgery does not change the characteristics of iris-patterns (iris-prints)
- a high reliability of iris-biometric patterns (prints), wherein no two persons have the same iris-patterns (iris-prints), not even identical-twins
- strong protection against spoofing attacks, namely using a synthetic iris, or an amputated eye to gain access, wherein capillaries in the iris decompose too rapidly to use a amputated eye to gain access
- rapid verification of iris-biometric, whenever matching newly captured data with data-cache
- a fraud proof security method, pairing 5G-WiFi INSIDE SECURE IRIS BIOMETRICS' LOGIN technology extracted biometrics data with country specific national identification number, or national passport number, or drivers license number granted in domicile country
- guaranteed enrollment, precluding no one from enrolling in 5G-WiFi INSIDE SECURE IRIS BIOMETRICS' LOGIN login technology, even if wearing a helmet, a mask, a religious veil, or a face occlusion hair style
- secure electronic data security, e-commerce, online-banking transaction, smartphones, tablets computers, laptop computers, desktop computers, and other smart devices
- capturing of iris from-a-distance, in lieu of using iris, if an enrolling user is wearing a helmet, a mask, a religious veil, or a face occlusion hair style
- safeguarding data and protect network
- guaranteed security, convenience, and fraud protection
- safe security feature to authenticate, and protect Blockchain Wallet from unauthorized access
- providing as an alternate system to protect electronic devices
- guaranteed unmatched safe, secure alternative to fingerprint login, especially during times of epidemics and/or pandemic outbreak of virus transmitted by fingers (touch)
- replacing use of passcodes, and offer convenience, as users no longer need to remember passcodes
- eliminating multiple passwords for applications and simplify user authentication process for applications accessible by multiple resources
- support for the enrolling of visually impaired, wherein 5G-WiFi INSIDE SECURE IRIS BIOMETRICS' LOGIN technology, iris-recognition is iris-patterns dependent, and not sight dependent guaranteed safe securing of portable devices, namely, smartphones, laptops, tablets, cameras including video cameras, entertainment and gaming devices securing cloud base computing applications protection from phishing (deceptive e-mail to obtain usernames, passwords and credit card details, accepting only e-mail sent with iris-biometric login authentication eliminating the risk of fraudulent purchasing products or services using stolen debit-card(s), and/or credit-card(s)

replacing hard-copy of travel documents with e-travel documents, allowing travelers to self-check-in, ensuring a greater level of convenience replacing the use of cards, passwords, ID numbers, and permit key-less access and entries making the typing of passwords obsolete, passwords are hard to remember, and if forgotten regaining access to smartphone, other smart devices, become a hassle providing the end-user with additional options, such as automatic identification service only, or automatic identification service with location-based service (LBS)

replacing photo virtual identifications, and door keys securing healthcare patient record management, matching patient iris-biometric, name and date of birth to safeguard against files error (iris-biometric characters remain constant)

securing workforce 5G-WiFi INSIDE SECURE IRIS BIOMETRICS' LOGIN technology attendance time management to prevent time theft, buddy time punching, extra payroll, increase security, accountability, and productivity automatically pairing 5G-WiFi INSIDE SECURE IRIS BIOMETRICS' LOGIN to end users' mobile phones Subscriber Identity Modules (SIM) card to prevent identity theft enrolling of biometric from both eye's iris, allowing the end-user to use 5G-WiFi INSIDE SECURE IRIS BIOMETRICS' LOGIN technology data from another eye in the event a bandage is covering one eye safeguarding and securing login to an email server to retrieve e-mail, and/or send e-mail guaranteed identity assurance guaranteeing a none-intrusive technology, no physical contact required ensuring a hygienic, no multi touching by multitude of people, unlike Automated Teller Machines (ATM) fingerprint sensor pad rapid verification of the biometric data guaranteeing reliability as a form of identification because of the uniqueness of iris-patterns guaranteeing a reliable identification to make life go more smoothly, also to make financial and business dealings safer and more efficient ensuring a secure operating platform for peer-to-peer digital currency trading/or transfer, business-to-business/or business-to-peer digital currency trading, and/or currency transfer guaranteeing a naturally convenient, and technically efficient identification mechanism, in lieu required hard-copy identifications, for verification, identification, and/or authentication ensuring a lifelong digital signature, and password that will never need to be remembered safeguard against fraudulent accessibility of automatic teller machines ATMs matching generated 5G-WiFi INSIDE SECURE IRIS BIOMETRICS' LOGIN virtual identification with Internet Protocol (IP) address to unlock smartphones, and other smart devices providing a cloud-based authentication, and biometrics integration to ensure enhanced cybersecurity ensuring a higher resilience to counterfeit, and data theft guaranteeing a strong protection against spoofing attacks, namely, using a synthetic iris, or an amputated eye to gain access elimination of password resets ensuring a contact-free unified identification process automating identity verification to support Industries of the Future(IotF), and Internet-of-Things (IoT), Cellular Internet-of-Things (CIoT)

boosting security, and deter theft of personal smart devices guaranteeing stable biometric record (glasses, contact lenses, and even eye surgery does not change the characteristics of iris-patterns)

safeguarding against accessibility of data stored on personal devices by others

The invention 5G-WiFi INSIDE SECURE IRIS BIOMETRICS' LOGIN is an improvement of prior invention including the original "Biometric personal identification system based on iris analysis March 1994, Daugman, John G. (Huntingdon, GB2) U.S. Pat. No. 5,291,560, A system for rapid and automatic identification of persons, with high reliability and confidence levels. The iris of the eye is used as an 'optical-fingerprint, having a highly detailed pattern that is unique for each individual and stable over many years."

Wherein the current invention 5G-WiFi INSIDE SECURE IRIS BIOMETRICS' LOGIN merge iris-biometric and periocular biometric to enable capturing iris-at-a-distance, plus adding voice recognition to facilitate the visually impaired, and pairing prior biometric modality embedded, or downloaded as software application onto personal devices, or public machines with 5G-WiFi INSIDE SECURE IRIS BIOMETRICS' LOGIN, to give the end-user as an alternate system.

The invention 5G-WiFi INSIDE SECURE IRIS BIOMETRICS' LOGIN operates as an all-inclusive identification system, precluding no one from enrolling in5G-WiFi INSIDE SECURE IRIS BIOMETRICS' LOGIN, even if wearing a helmet, a mask, a religious veil, or a face occlusion hair style.

This invention 5G-WiFi INSIDE SECURE IRIS BIOMETRICS' LOGIN is an embodiment of a hybrid multi-lingual, multi-modal biometric technology using verification, virtual identifications, and classification (gender classification) of individual enrollee.

The invention 5G-WiFi INSIDE SECURE IRIS BIOMETRICS' LOGIN is a modality for social media, and peer-to peer applications.

This invention 5G-WiFi INSIDE SECURE IRIS BIOMETRICS' LOGIN facilitates the enrolling iris biometric of both eyes' iris, allowing the end-user to use iris-biometric from either eye's iris, in an event a bandage is covering one eye. Unlike prior inventions, the current invention is multi-modal biometric system utilizing more than one physiological characteristic for enrollment, verification, and/or identification.

The invention 5G-WiFi INSIDE SECURE IRIS BIOMETRICS' LOGIN unlike prior inventions allow new registrants optional benefit of using country specific national identification number, or drivers license number granted in domicile country in lieu of username with 5G-WiFi INSIDE SECURE IRIS BIOMETRICS' LOGIN identification data for registration, and future authentication when using public machines such as Automated Teller Machines (ATM), self-check-in machines, self-checkout machines, self-serve machines, and/Point-of-Sale (POS) machines.

This invention 5G-WiFi INSIDE SECURE IRIS BIOMETRICS' LOGIN includes a process to secure smartphones, tablets, laptops, desktop computers, other smart devices,Automated Teller Machines (ATM), self-check-in machines, self-checkout machines, self-serve machines, other public machines, buildings, and facilities.

The invention 5G-WiFi INSIDE SECURE IRIS BIOMETRICS' LOGIN data cannot be stolen in similar manner as a password, and/or token.

Wherein the invention 5G-WiFi INSIDE SECURE IRIS BIOMETRICS' LOGIN uses iris-biometric pattern-recognition techniques on images of the iris for the generating of algorithmic identifications to uniquely identify individuals for authentication.

The present disclosure must be considered as an exemplification of the invention, and is not intended to limit the invention to the specific embodiment illustrated by the figures, or description below. In describing the invention, it must be understood that figures as depicted operate inter-connectivity, as 5G-WiFi INSIDE SECURE IRIS BIOMETRICS' LOGIN.

Figure 1:
FIG. 1 depicts logo on the software package containing the DVDs loaded with the invention 5G-WiFi INSIDE SECURE IRIS BIOMETRICS' LOGIN Broad-band-technology (BB-T) Automated Iris-biometrics-login Identification System (AIIS) software.

As reference in the appended figures presented the embodiment of the invention "5G-WiFi INSIDE SECURE IRIS BIOMETRICS' LOGIN", FIG. 1 depicts logo on the software package containing the DVDs loaded with the invention 5G-WiFi INSIDE SECURE IRIS BIOMETRICS' LOGIN Broad-band-technology (BB-T) Automated Iris-biometrics-login Identification System (AIIS) as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI).

Figure 2:
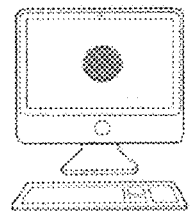
FIG. 2 depicts a depicts a proprietary internet-interoperability ($i_2$) desk-top computer, linked to a Central Processing Unit (CPU).

As reference in the appended figures presented the embodiment of the invention "5G-WiFi INSIDE SECURE IRIS BIOMETRICS' LOGIN", FIG. 2 depicts a depicts a proprietary internet-interoperability ($i_2$) desk-top computer, linked to a Central Processing Unit (CPU). Wherein proprietary integrated circuit (IC) (monolithic integrated circuit/microchip), and proprietary Internet-Interoperability ($i_2$) wireless modem are soldered onto motherboard as secure element into Central Processing Units (CPU) enabling wireless-connections, and wirelessMachine-to-Machine (M2M) communication.

Figure 3:
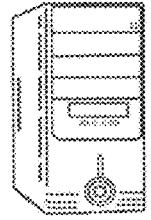
FIG. 3 depicts an apparatus housing central processing unit (CPU).

As reference in the appended figures presented the embodiment of the invention 5G-WiFi INSIDE SECURE IRIS BIOMETRICS' LOGIN, FIG. 3 depicts an apparatus housing central processing unit (CPU). Wherein proprietary integrated circuit (IC) (monolithic integrated circuit/microchip), and proprietary Internet-Interoperability ($i_2$) wireless modem are soldered onto motherboard as secure element into Central Processing Units (CPU) enabling wireless-connections, and wirelessMachine-to-Machine (M2M) communication.

Figure 5:
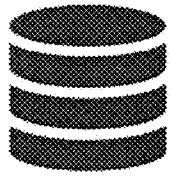
FIG. 5 depicts an authentication database used for electronically collecting, organizing, and storing of data references-templates of subscribers, users, and/or client a.k.a members virtual identifications.
Figure 4:
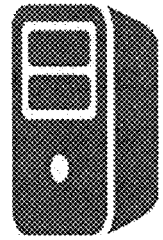
FIG. 4 depicts a proprietary
Internet-Interoperability ($i_2$) web-server.

As reference in the appended figures presented the embodiment of the invention 5G-WiFi INSIDE SECURE IRIS BIOMETRICS' LOGIN, FIG. 4 depicts a proprietary Internet-Interoperability ($i_2$) web-server used for hosting the invention 5G-WiFi INSIDE SECURE IRIS BIOMETRICS' LOGIN Broad-band-technology (BB-T) Automated Iris-biometrics-login Identification System (AIIS) as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI). Wherein the proprietary Internet-Interoperability ($i_2$) we-server host the listed features:

hosting the proprietary embedded Fifth Generation Software Hardware Security Module (5G-SoftHSM) Cybersecurity software application suite hosting the Internet Protocol (IP) addressed, and/or Domain Name (DN) Uniform Resource Locator (URL) website linking the invention 5G-WiFi INSIDE SECURE IRIS BIOMETRICS' LOGIN processing web-browsers' Hypertext Transfer Protocol (HTTP) requests, and linking of individual registrant using iris-biometrics login virtual identification for authentication, replacing multiple passwords, allowing individual Global Single-Sign-On (G-SSO), automating identifications, with a plurality access of global computers, accessing web-browser, search-engine, middleware, Operating-System functionalities across multi-language platforms As reference in the appended figures presented in the embodiment of the invention 5G-WiFi INSIDE SECURE IRIS BIOMETRICS' LOGIN, FIG. 5 depicts an authentication database used for electronically collecting,organizing, and storing of data references-templates of subscribers, users, and/or client a.k.a members virtual identifications, compiled using biometric data paired to country specific national identification number, or national passport number, or drivers license number granted in domicile country for authentication.

Figure 6:
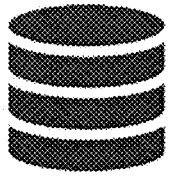
FIG. 6 depicts a transactions database used for electronically collecting, organizing, and storing of data accessed on the World Wide Web, and/or data of electronic transactions.

As reference in the appended figures presented in the embodiment of the invention"5G-WiFi INSIDE SECURE IRIS BIOMETRICS' LOGIN", FIG. 6 depicts a transactions database used for electronically collecting, organizing, and storing of data accessed on the World Wide Web, and/or data of electronic transactions. collecting, organizing, and storing data of the invention 5G-WiFi INSIDE SECURE IRIS BIOMETRICS' LOGIN Broad-band-technology (BB-T) Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), automating identifications with plurality access of global computer network, accessing web-browser, search-engine, middle-ware, and Operating-System (OS) functionalities across multi-language platforms. Wherein referencing template used in matching, and identification for access authentication are electronically collected, organized, managed, stored archived in the database, as reference-templates generated from end-users biometric data input paired to enrolling users' country specific national identification number, or national passport number, or drivers license number granted in domicile country, for use as iris-biometrics' login virtual identifications, referencing template used in matching, and identification for access authentication.

Figure 7:
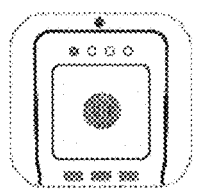
FIG. 7 depicts a proprietary internet-interoperability ($i_2$) self-serve apparatus for online bill payments and electronic funds transfer.

As reference in the appended figures presented in the embodiment of the invention 5G-WiFi INSIDE SECURE IRIS BIOMETRICS' LOGIN, FIG. 7 depicts a proprietary internet-interoperability ($i_2$) self-serve apparatus for online bill payments and electronic funds transfer, embedded with 5G-WiFi INSIDE SECURE IRIS BIOMETRICS' LOGIN" Broad-band-technology (BB-T) Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), and embedded as Fifth Generation Software Hardware Security Module (5G-SoftHSM) embedded into Hardware Security Module (HSM), operable as cybersecurity software application suite, for encrypting iris-biometrics login virtual identification for individual registrant authentication, whenever posting payment transactions for electronic funds transfer, bill distribution or payments, using credit-cards, debit-cards,bitcoin or e-cash, and/or performing the posting of payment transactions for commerce, namely, e-commerce (e-shopping/online-shopping).

As reference in the appended figures presented in the embodiment of the invention 5G-WiFi INSIDE SECURE IRIS BIOMETRICS' LOGIN, FIG. 8 depicts a proprietary internet-interoperability ($i_2$) wireless modem for embedding as secure element soldered into proprietary internet-interoperability ($i_2$) Central-Processing Units (CPU). Wherein internet-Interoperability ($i_2$) wireless modem soldered onto motherboard as secure element into Central Processing Units (CPU) enable wireless-connections, and wireless Machine-to-Machine (M2M) communication via Fifth Generation Radio Access Network (5G-RAN), or Fifth Generation New Radio (5G-NR).

Figure 9:
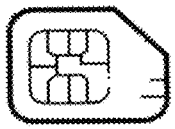
FIG. 9 depicts a proprietary plug-in Subscriber Identity Module (SIM) card operable as proprietary Subscriber Identity Module (SIM) emeddded with proprietary internet-interoperable (ix) Subscriber Identity Module (SIM) toolkit personalize as Unique Subscriber Identity Module (U-SIM).

As reference in the appended figures presented in the embodiment of the invention "5G-WiFi INSIDE SECURE IRIS BIOMETRICS' LOGIN", FIG. 9 depicts a proprietary plug-in Subscriber Identity Module (SIM) card operable as proprietary Subscriber Identity Module (SIM) embedded with proprietary internet-interoperable ($i_2$) Subscriber Identity Module (SIM) toolkit personalizing the Subscriber Identity Module (SIM) card as a proprietary internet-interoperability (ii) Unique Subscriber Identity Module (U-SIM)/$i_2$ U-SIM.

Figure 10:
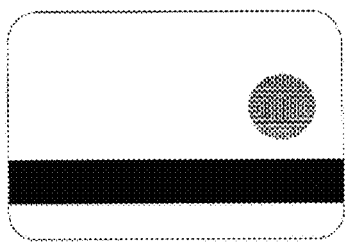
FIG. 10 depicts a proprietary 5G-WiFi INSIDE SECURE IRIS BIOMETRICS' LOGIN proprietary internet-interoperability ($i_2$) card or smart-card.

As reference in the appended figures presented in the embodiment of the invention, FIG. 10 depicts a proprietary 5G-WiFi INSIDE SECURE IRIS BIOMETRICS' LOGIN proprietary internet-interoperability (ii) card or smart-card, wherein the smart-card is embedded with an Integrated Circuit (IC) (monolithic integrated circuit/microchip) as a semiconductor chip, control by Artificial Intelligence (AI) operable with Fifth Generation Software Hardware Security Module (5G-SoftHSM) cybersecurity software application suite for encrypting iris-biometrics login virtual identification for individual registrant authentication, whenever posting payment transactions for electronic e-commerce (e-shopping/online-shopping), and/or when used as a bank-card.

Figure 11:
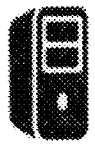
FIG. 11 depicts a proprietary 5G-WiFi INSIDE SECURE IRIS BIOMETRICS' LOGIN user authentication-server.

As reference in the appended figures presented in the embodiment of the invention 5G-WiFi INSIDE SECURE IRIS BIOMETRICS' LOGIN, FIG. 11 depicts a 5G-WiFi INSIDE SECURE IRIS BIOMETRICS' LOGIN users' authentication-server, operable for collecting sensor data, combination of image acquisition, preprocessing functions, or combination of image acquisition, recognition functions, or combination of image preprocessing, and recognition functions, for matching, identification and authentication.

Figure 12:
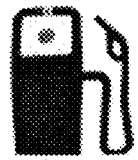
FIG. 12 depicts a sample of a self-serve coin-freed apparatus with meter-controlled for dispensing of liquid, gas, and/or electricity.

As reference in the appended figures presented in the embodiment of the invention 5G-WiFi INSIDE SECURE IRIS BIOMETRICS' LOGIN, FIG. 12 depicts a self-serve coin-freed apparatus with meter-control for dispensing of liquid, gas, and/or electricity, embedded with 5G-WiFi INSIDE SECURE IRIS BIOMETRICS' LOGIN Broad-band-technology (BB-T) Automated Iris-biometrics-login Identification System (AIIS), supporting Machine-to-Machine (M2M) system-architecture-evolution solution (SAES), providing Global Single-Sign-On (G-SSO) protocols for virtual identifications, replacing multiple passwords, automating identifications with plurality access of global computer network, using machine learning algorithm, control by Artificial Intelligence (AI), operable for end-users' authentication, verifying identity for authorization, billing, and card payment.

Figure 13:
FIG. 13 depicts a proprietary internet-interoperability ($i_2$) non-foldable ix MINI smartphones.

As reference in the appended figures presented in the embodiment of the invention 5G-WiFi INSIDE SECURE IRIS BIOMETRICS' LOGIN, FIG. 13 depicts a proprietary internet-interoperability ($i_2$) non-foldable $i_2$ MINI smartphones embedded with Fifth Generation Wireless Freespace internet-connectivity (5G-WiFi), and Fifth Generation Software Hardware Security Module (5G-SoftHSM) embedded into Hardware Security Module (HSM), as cybersecurity software application suite, linking Radio Access Technology (RAT), using Multiple Output (MIMO) Over-the-Air (OTA), connecting Fifth Generation New Radio (5G-NR) via Fifth Generation Spectrum (5G-S) Evolved Universal Terrestrial Radio Access (E-UTRA), or Universal Terrestrial Radio Access (UTRA), with similar functional characteristics as a smartphone, but more. Wherein after the proprietary internet-interoperability ($i_2$) smartphone embedded with Fifth Generation Wireless Freespace internet-connectivity (5G-WiFi), and proprietary Automated Iris-biometrics-login Identification System (AHS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), and Fifth Generation Software Hardware Security Module (5G-SoftHSM) embedded into Hardware Security Module (HSM), as cybersecurity software application suite, using 5G-WiFi INSIDE SECURE IRIS BIOMETRICS' LOGIN protocols to verify, authenticate, and authorize, by matching user-to-device (U2D), the device is thereby enabled to be operable as a standalone, and/or as a Remote-control-device (RCD). If operable as a standalone some functions include subscribers, users, and/or client a.k.a members' authentication, verifying user identity, or authorization, and access security to prevent unauthorized access, and used for connection setup, mobility data transfer, for Image acquisition, e-mailing, short message service (SMS), Web browsing, social networking, bill distribution or payments, remote banking, or home banking, and commerce, namely e-commerce (e-shopping). Whenever operable as Remote-control-device (RCD) the $i_2$ phone function as Remote-Access-Control-Equipment (RACE) for equipment-to-equipment (E2E) connections, including: for power-on or power-off, to enable or disabling, or connect and control remotely, Enhanced Definition Television (EDTV), High Definition Television (HDTV), Mobile/Handheld Television (M/H-TV), Next Generation Handheld Television (NGH-TV), computers, User Equipment (UE), Mobile Equipment (ME), Internet of Things (IoT), Cellular Internet of Things (CIoT) Internet-of-Things s (IoT-D), Industrial Internet-of-Things (I-IoT), Industries of the Future Apparatus (IotF-A) Industries of the Future Machines (IotF-M), Point of Sale (POS) apparatus, and other apparatus.

Figure 15:
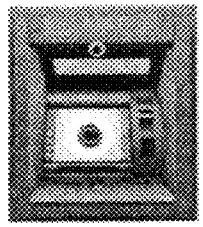
FIG. 15 depicts a proprietary internet-Interoperability ($i_2$) Automated Teller Machine (ATM).
Figure 14:
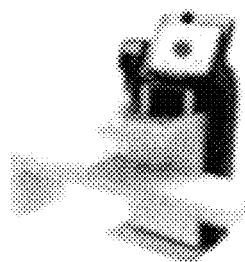
FIG. 14 depicts a proprietary internet-Interoperability ($i_2$) Point-of-Sale (POS) type terminal machine.
Figure 16:
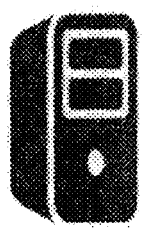
FIG. 16 depicts a proprietary internet-Interoperability ($i_2$) transaction server.

FIG. 14—FIG. 14 depicts a proprietary internet-Interoperability ($i_2$) Point-of-Sale (POS) type terminal machine, embedded with 5G-WiFi INSIDE SECURE IRIS BIOMETRICS' LOGIN Broad-band-technology (BB-T) Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), and Fifth Generation Software Hardware Security Module (5G-SoftHSM) embedded into Hardware Security Module (HSM), as cybersecurity software application suite, for encrypting 5G-WiFi INSIDE SECURE IRIS BIOMETRICS' LOGIN data for authentication, automating identifications, for electronic payment, and authentication verifying user identity, or authorization, and access security to prevent unauthorized access, fraud prevention, and fraud detection. Wherein methods of the proprietary $i_2$ Point-of-Sale type terminal machine include, but not limited to:

- methods for transacting electronic payments
- methods for redeeming electronic coupons
- methods for linking cloud-based servers for verification of biometric captured for processing electronic payments
- methods for communication machine-to-machine (M2M) with proprietary $i_2$ smartphones, and/or third-party smartphones embedded with proprietary 5G-WiFi INSIDE SECURE IRIS BIOMETRICS' LOGIN Iris-biometrics-login Identification System (MIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), and Fifth Generation Software Hardware Security Module (5G-SoftHSM) embedded into Hardware Security Module (HSM), as cybersecurity software application suite
- methods for linking machine-to-machine (M2M) with smart-carts, and/or smart-baskets in verification of electronic payment for authorization to checkout, wherein if items scanned by smart-carts, and/or smart-baskets have already been paid-in-full electronically, customers will be issued a thank you message in the language of the customer, and also be printed a paper receipt upon request
- methods for autonomous scanning of products customers are walking through proprietary $i_2$ Point-of-Sale (POS) type terminal machine check-out As reference in the appended figures presented in the embodiment of the invention 5G-WiFi INSIDE SECURE IRIS BIOMETRICS' LOGIN, FIG. 15 depicts a proprietary internet-Interoperability ($i_2$) Automated Teller Machine (ATM), embedded with 5G-WiFi INSIDE SECURE IRIS BIOMETRICS' LOGIN Broad-band-technology (BB-T) Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm operable with a particular learning algorithm, and/or technique, control by Artificial Intelligence (AI), and Fifth Generation Software Hardware Security Module (5G-SoftHSM) embedded into Hardware Security Module (HSM), as cybersecurity software application suite, for encrypting iris-biometrics' login data for authentication, automating identifications, for electronic payment, and authentication verifying user identity, or authorization, and access security to prevent unauthorized access, fraud prevention, fraud detection, and for access subscribers, users, and/or client a.k.a members' accounts to lodge money, and/or withdraw money. Wherein the proprietary internet-Interoperability ($i_2$) Automated Teller Machine (ATM) is operable as cloud-based. Wherein methods of the proprietary internet-Interoperability ($i_2$) Automated Teller Machine (ATM) include, but not limited to:

- Network, system, and methods for operating Automated Teller Machine (ATM)
- Network, system, and methods for linking cloud-base authentication-servers
- Network, system, and methods for linking cloud-base authentication-servers As reference in the appended figures presented in the embodiment of the invention 5G-WiFi INSIDE SECURE IRIS BIOMETRICS' LOGIN, FIG. 16 depicts a proprietary internet-Interoperability (ii) transaction server embedded with 5G-WiFi INSIDE SECURE IRIS BIOMETRICS' LOGIN Automated Iris-biometrics-login Identification System (ALIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm operable with a particular learning algorithm, and/or technique, control by Artificial Intelligence (AI), and Fifth Generation Software Hardware Security Module (5G-SoftHSM) embedded into Hardware Security Module (HSM), cybersecurity software application suite, operable for identity check, and for transactions, namely, using e-cash and/or performing electronic payment transactions for commerce, namely, e-commerce (e-shopping), electronic funds transfer, bill distribution, or bill payments.

Figure 17:
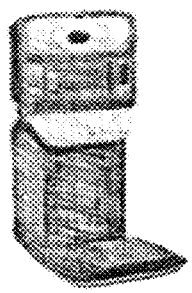
FIG. 17 depicts a standalone internet-Interoperability ($i_2$) Automated Airport Self-check-in Machine ($A_2$SM).
Figure 18:
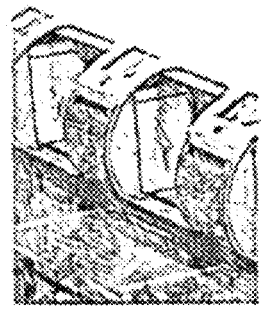
FIG. 18 depicts an airport self-check-in counter with multiple mini-computers
Figure 19:
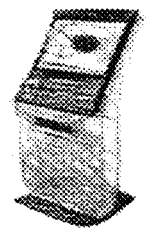
FIG. 19 depicts a standalone apparatus operating as an airport self-check-in machine.
Figure 20:
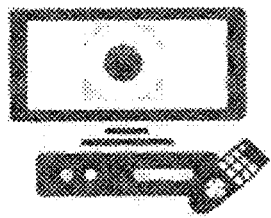
FIG. 20 depicts a television-system consisting of a television set, a remote control, and a subscriber multimedia set-top box (STB).

As reference in the appended figures presented in the embodiment of the invention 5G-WiFi INSIDE SECURE IRIS BIOMETRICS' LOGIN, FIG. 17 depicts a standalone internet-Interoperability ($i_2$) Automated Airport Self-check-in Machine ($A_2$SM), operable for airline(s) baggage check-on, embedded with 5G-WiFi INSIDE SECURE IRIS BIOMETRICS' LOGIN Automated Iris-biometrics-login Identification System (AHS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), and Fifth Generation Software Hardware Security Module (5G-SoftHSM) embedded into Hardware Security Module (HSM), as cybersecurity software application suite, used for subscribers, users, and/or client a.k.a members' authentication, verifying identity, or authorization, and access security to prevent unauthorized access, fraud prevention, fraud detection, baggage check-on, and contact-free billings. Wherein methods of the internet-Interoperability ($i_2$) Automated Airport Self-check-in Machine ($A_2SM$) include, but not limited to:

Network, system, and methods for operating Automated Airport Self-check-in Machine ($A_2SM$)
    Network, system, and methods for linking cloud-base authentication-servers
    Network, system, and methods for linking cloud-base authentication-servers As reference in the appended figures presented in the embodiment of the invention 5G-WiFi INSIDE SECURE IRIS BIOMETRICS' LOGIN, FIG. 18 depicts an airport self-check-in counter with multiple mini-computers embedded with 5G-WiFi INSIDE SECURE IRIS BIOMETRICS' LOGIN, Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), and Fifth Generation Software Hardware Security Module (5G-SoftHSM) embedded into Hardware Security Module (HSM), as cybersecurity software application suite. Wherein methods of the internet-Interoperability ($i_2$) Automated Airport Self-check-in Machine ($A_2SM$) include, but not limited to:

Network, system, and methods for operating Automated Airport Self-check-in Machine ($A_2SM$)
    Network, system, and methods for linking cloud-base authentication-servers
    Network, system, and methods for linking cloud-base authentication-servers
    checking travelers identity to guarantee secure-access
    preventing unauthorized access
    electronic tickets purchasing
    airlines' boarding passengers flights confirmation As reference in the appended figures presented in the embodiment of the invention 5G-WiFi INSIDE SECURE IRIS BIOMETRICS' LOGIN, FIG. 19 depicts a standalone internet-Interoperability ($i_2$) Automated Airport Self-check-in Machine ($A_2SM$) embedded with 5G-WiFi INSIDE SECURE IRIS BIOMETRICS' LOGIN, Automated Iris-biometrics-login Identification System (AIIS), as a Convolutional Neural Network (CNN) supporting Machine-to-Machine (M2M) system-architecture-evolution solution (SAES), providing Global Single-Sign-On (G-SSO) protocols for virtual identifications, replacing multiple passwords, automating identifications, with machine learning algorithm using a particular learning algorithm, and/or technique, control by Artificial Intelligence (AI), using machine learning algorithm, operable by Artificial Intelligence (AI) Fifth Generation Software Hardware Security Module (5G-SoftHSM) embedded into Hardware Security Module (HSM), as cybersecurity software application suite. Wherein methods of the internet-Interoperability ($i_2$) Automated Airport Self-check-in Machine ($A_2SM$) include, but not limited to:

Network, system, and methods for operating Automated Airport Self-check-in Machine ($A_2SM$)
    Network, system, and methods for linking cloud-base authentication-servers
    Network, system, and methods for linking cloud-base authentication-servers
    checking travelers identity to guarantee secure-access
    preventing unauthorized access
    electronic tickets purchasing
    airlines' boarding passengers flights confirmation As reference in the appended figures presented in the embodiment of the invention 5G-WiFi INSIDE SECURE IRIS BIOMETRICS' LOGIN, As reference in the appended figures presented in the embodiment of the invention 5G-WiFi INSIDE SECURE IRIS BIOMETRICS' LOGIN, FIG. 20 depicts a television-system consisting of a television set, a remote control, and a subscriber multimedia set-top box (STB), embedded with internet-Interoperability ($i_2$) wireless modem soldered onto motherboard as secure element into Central Processing Units (CPU) enable wireless-connections, wireless-internet, and wireless-television broadcasting. Wherein the set-top box (STB) is operable as television set channel transceiver, multiplexer (multiplexor/mux), de-multiplexers,multiplexing (muxing) for transmitting multiple broadcast signals.

Figure 21:
FIG. 21 depicts a Hybrid electric vehicles (HEV).

As reference in the appended figures presented in the embodiment of the invention 5G-WiFi INSIDE SECURE IRIS BIOMETRICS' LOGIN, FIG. 21 depicts a Hybrid electric vehicles (HEV) with internet-Interoperability ($i_2$) wireless modem soldered onto motherboard as secure element into Central Processing Units (CPU) of vehicles' computer system, wherein Artificial Intelligence (AI) facilitate key-less access, and key-less ignition switch control.

Figure 22:
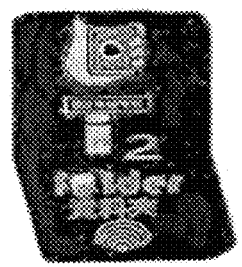
FIG. 22 depicts a proprietary multi-color, multi-language, bidirectional internet-interoperability $i_2$ FOLDER smartphones.

As reference in the appended figures presented in the embodiment of the invention "5G-WiFi INSIDE SECURE IRIS BIOMETRICS' LOGIN", FIG. 22 depicts a proprietary multi-color, multi-language, bidirectional internet-interoperability $i_2$ FOLDER smartphones, wherein from a folded closed position at 0°, the $i_2$ phone can be folded any degree between 1° degree to 90°, or 180°, or 270° to 360° backward, and reverse this process to returning the device to a folded unopened position.

Figure 23:
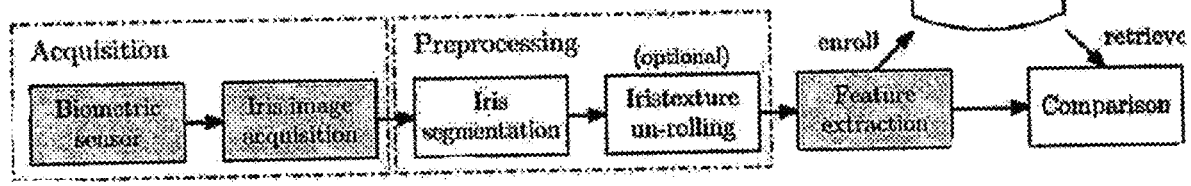
FIG. 23 depicts the processes used for generating subscribers, users, and/or client a.k.a members' Automated Iris-biometrics-login Identification System (AIIS) virtual identifications.

As reference in the appended figures presented in the embodiment of the invention 5G-WiFi INSIDE SECURE IRIS BIOMETRICS' LOGIN, FIG. 23 depicts the processes used for generating subscribers, users, and/or client a.k.a members' Automated Iris-biometrics-login Identification System (AIIS) virtual identifications, wherein the process involve using device or machine builtin camera or external camera(s), biometric sensor, powered by artificial intelligence (AI) controlling and managing recognition of biometric patterns, image capturing, image enhancement, dividing image into blocks, sub images, or windows, region-based segmentation, image analysis, image data formatting, using the combination of image acquisition and preprocessing functions, or combination of image acquisition and recognition functions, or combination of image preprocessing and recognition functions, utilizing algorithm culminating with an algorithmic finite number of steps to generate 5G-WiFi INSIDE SECURE IRIS BIOMETRICS' LOGIN virtual identifications data, collecting and storing end-users generated virtual identification as electronic biometric-templates into authentication-servers As reference in the appended figures presented in the embodiment of the invention 5G-WiFi INSIDE SECURE IRIS BIOMETRICS' LOGIN, FIG. 24 depicts a proprietary logo embossed around casting operable as a shield for protecting external view finder (eyepiece) of proprietary foldable internet-interoperability $i_2$ FOLDER smartphones, and proprietary non-foldable internet-interoperability $i_2$ MINI smartphones, wherein the embossing of a logo around the viewfinder (eyepiece) of smartphones is a novel and unique method of branding, as claimed in this invention 5G-WiFi INSIDE SECURE IRIS BIOMETRICS' LOGIN.

As reference in the appended figures presented the embodiment of the invention "5G-WiFi INSIDE SECURE IRIS BIOMETRICS' LOGIN", FIG. 25 depicts a set of proprietary internet-interoperability ($i_2$) Internet Protocol (IP) autofocus camera(s)/$i_2$IP autofocus camera(s), operable with proprietary internet-interoperability ($i_2$) wireless modem embedded as secure element soldered into $i_2$IP-camera(s) Central Processing Units (CPU) embedded with proprietary integrated circuit (IC) (monolithic integrated circuit/microchip), proprietary internet-interoperability ($i_2$) integrated circuit (IC) (monolithic integrated circuit/microchip). Wherein $i_2$IP-camera(s) are operable as autofocus camera(s) for taking photographs using electronic image sensors for biometric data extraction, using machine learning algorithm, control by Artificial Intelligence (AI) facilitating the integrating of iris-biometrics with periocular-biometric for enabling the capture of iris-at-a-distance, capturing facial periocular and iris-biometric images, uploading the biometric images data for processing, and transformation into biometric-templates, usuable as electronic query templates involving template matching and pattern matching for subscribers, users, and/or client a.k.a members' identifications, automated for management arrangements, verification, and validation for virtual identifications, classification, authentication, and authorization, with automating multiple translatable virtual addresses, and virtual-identifications.

Figure 26:
FIG. 26 depicts a diagrammatic view of the invention 5G-WiFi INSIDE SECURE IRIS BIOMETRICS' LOGIN proprietary satellite-communication system "Aurora Polaris" depicting a representation of earth and four (4) earth-orbiting spacecrafts as: two (2) Aurorae Borealis (northern lights satellites) Illuminated-flying-saucer Designed Satellite with proprietary Collision Control ($C_2$) Navigation System (NS), and two (2) Aurorae Australi (southern lights satellites) Illuminated-flying-saucer Designed Satellite with proprietary Collision Control ($C_2$) Navigation System (NS).

As reference in the appended figures presented in the embodiment of the invention "5G-WiFi INSIDE SECURE IRIS BIOMETRICS' LOGIN", FIG. 26 depicts a diagrammatic view of the invention 5G-WiFi INSIDE SECURE IRIS BIOMETRICS' LOGIN proprietary satellite-communication system "Aurora Polaris" depicting a representation of earth and four (4) earth-orbiting spacecrafts as: two (2) Aurorae Borealis (northern lights satellites) Illuminated-flying-saucer Designed Satellite with proprietary Collision Control ($C_2$) Navigation System (NS), and two (2) Aurorae Australi (southern lights satellites) Illuminated-flying-saucer Designed Satellite with proprietary Collision Control ($C_2$) Navigation System (NS), operable as synchronous satellites whereby satellites' speed in orbit are matched to the speed of rotation of the earth on its axis, and for communication over freespace, where movement of energy in any direction is substantially unimpeded from-a-distance such as the atmosphere, the ocean or the earth. Wherein the embodiment is systems, and methods operable as freespace universal connectivity for communication from geostationary (GEO) satellites, and Low earth-orbiting (LEO) satellites transmitting relay signal to omnidirectional Satellite Ground Station (SGS) (earth-station/ground terminal), as space-to-ground transceiver, and/or ground-to-space transceiver, also as a point-to-point bidirectional transceiver, with connection arrangements to subscribers, users, and/or client a.k.a members, to-and-from telecommunication providers, or internet providers.

Figure 27:
FIG. 27 depicts an unmanned remote-access-control airborne vehicle in the formation of a drone aircraft.

As reference in the appended figures presented in the embodiment of the invention "5G-WiFi INSIDE SECURE IRIS BIOMETRICS' LOGIN", FIG. 27 depicts an unmanned remote-access-control airborne vehicle in the formation of a drone aircraft. Wherein the remote-access-control airborne drone aircraft or parts thereof functionalities include an active satellite-mounted antenna with methods operable as with omnidirectional reception antenna for collecting and streaming remote sensing satellite data to a variety of users and applications, with universal connectivity for communication from Geostationary (GEO) satellites, and Low earth-orbiting (LEO) satellites transmitting relay signals to Satellite Ground Station (SGS) (earth-station/ground terminal) as sky-to-ground transceiver, and/or sky-to-space transceiver, also as a point-to-point bidirectional transceiver, with connection arrangements to subscribers, clients,and/or users, to-and-from telecommunication providers, or internet providers.

Figure 28:
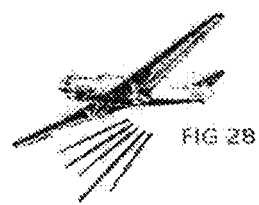
FIG. 28 depicts an airborne jet aircraft.

As reference in the appended figures presented in the embodiment of the invention "5G-WiFi INSIDE SECURE IRIS BIOMETRICS' LOGIN", FIG. 28 depicts an airborne jet aircraft having operational parts thereof functionalities including active satellite-mounted antenna(s) with methods operable as with omnidirectional reception antenna for collecting and streaming remote sensing satellite data to a variety of users and applications, with universal connectivity for communication from Geostationary (GEO) satellites, and Low earth-orbiting (LEO) satellites transmitting relay signals to Satellite Ground Station (SGS) (earth-station/ground terminal) as sky-to-ground transceiver, and/or sky-to-space transceiver, also as a point-to-point bidirectional transceiver, with connection arrangements to subscribers, clients,and/or users, to-and-from telecommunication providers, or interne providers.

Figure 29:
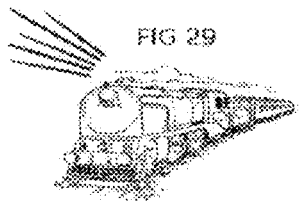
FIG. 29 depicts a locomotive.

As reference in the appended figures presented in the embodiment of the invention "5G-WiFi INSIDE SECURE IRIS BIOMETRICS' LOGIN", FIG. 29 depicts a locomotive having operational parts thereof as an active satellite-mounted antenna, having methods operable as a Satellite Ground Station (SGS) (earth-station/ground terminal) with omnidirectional reception antenna for collecting and streaming remote sensing satellite data to a variety of users and applications, with universal connectivity for communication from Geostationary (GEO) satellites, and Low earth-orbiting (LEO) satellites transmitting relay signals to Satellite Ground Station (SGS) (earth-station/ground terminal) parabolic omnidirectional antenna as space-to-ground transceiver, and/or ground-to-space transceiver, also as a point-to-point bidirectional transceiver, with connection arrangements to subscribers, clients, and/or users, to-and-from telecommunication providers, or interne providers.

Figure 30:
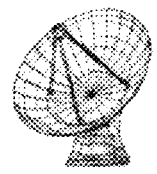
FIG. 30 depicts a Very-Small-Aperture Terminal (VSAT) with a dish antenna.

As reference in the appended figures presented in the embodiment of the invention "5G-WiFi INSIDE SECURE IRIS BIOMETRICS' LOGIN", FIG. 30 depicts a Very-Small-Aperture Terminal (VSAT) with a dish antenna, operable as a two-way Ground Station (SGS) (earth-station/ground terminal) parabolic omnidirectional antenna. Wherein the embodiment is systems, and methods operable as operable as an omnidirectional reception antenna for wireless-terrestrial-television-broadcast, and wireless telephonic communication ($W_2$) with functionalities including:

5G-WiFi Voice over Internet protocol (VoIP),collecting and streaming remote sensing satellite data to a variety of users and applications, with universal connectivity for communication from Geostationary (GEO) satellites, and Low earth-orbiting (LEO) satellites transmitting relay signals to Satellite Ground Station (SGS) (earth-station/ground terminal) parabolic omnidirectional antenna as space-to-ground transceiver, and/or ground-to-space transceiver, also as a point-to-point bidirectional transceiver, with connection arrangements to subscribers, clients,and/or users, to-and-from telecommunication providers, or interne providers, supporting Fifth Generation Quantum Technology (5G-QT) sending, and/or receiving radio wave energy, via Evolved Universal Terrestrial Radio Access Network (E-UTRAN), or Universal Terrestrial Radio Access Network (UTRAN) operable as a Global Navigation Satellite System (GNSS), Global System for Mobile-communications (GSM) with Global Positioning System (GPS), and Global Positioning System Aided Geo Augmented Navigation (GAGAN), as a Fifth Generation Core Network (5G-CN), and Fifth Generation System (5G-S) for:

Universal Terrestrial Radio Access and Universal Mobile Telecommunication Systems (UTRA/UMTS)

Fifth Generation Radio Access Network (5G-RAN)

Fifth Generation New Radio (5G-NR), via, Fifth Generation Spectrum (5G-S) Evolved Universal Terrestrial Radio Access (E-UTRA), and/or Universal Terrestrial Radio Access (UTRA)

Radio Access Technology (RAT), using Multiple Output (MIMO) Over-the-Air (OTA), connecting Fifth Generation New Radio (5G-NR)

Digital Terrestrial Television (DTT) for Digital Video Broadcasting-Terrestrial (DVB-T)

Digital Terrestrial Television (DTT) for Digital Video Broadcasting (DVB)

Digital Terrestrial Television (DTT) for Digital Video Broadcasting-Handheld (DVB-H)

Digital Terrestrial Television (DTT) for Enhanced Definition Television (EDTV)

Digital Terrestrial Television (DTT) for High Definition Television (HDTV)

Digital Terrestrial Television (DTT) for Video Broadcasting-Satellite services to Handhelds (DVB-SH)

Digital Terrestrial Television (DTT) for Digital Video Broadcasting-Next Generation Handheld (DVB-NGH)

Digital Terrestrial Television (DTT) for Digital Terrestrial Multimedia Broadcast (DTMB) for Integrated Services Digital Broadcasting-Satellite (ISDB-S) for Digital Television (DTV) and digital radio.

Figure 31:
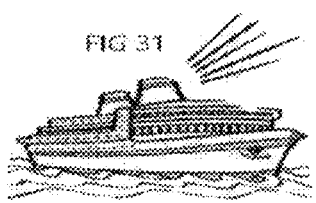
FIG. 31 depicts a waterborne watercraft.

As reference in the appended figures presented in the embodiment of the invention "5G-WiFi INSIDE SECURE IRIS BIOMETRICS' LOGIN", FIG. 31 depicts a waterborne watercraft, having operational parts thereof as an active satellite-mounted antenna having methods operable as a waterborne Satellite Ground Station (SGS) (earth-station/ground terminal) with omnidirectional reception antenna for collecting and streaming remote sensing satellite data to a variety of users and applications, with universal connectivity for communication from Geostationary (GEO) satellites, and Low earth-orbiting (LEO) satellites transmitting relay signals to Satellite Ground Station (SGS) (earth-station/ground terminal) parabolic omnidirectional antenna as space-to-ground transceiver, and/or ground-to-space transceiver, also as a point-to-point bidirectional transceiver, with connection arrangements to subscribers, users, and/or client a.k.a members, to-and-from telecommunication providers, or internet providers.

The invention claimed is:

1. An apparatus for Automated Iris-biometrics-login Identification System (AIIS) software application, the apparatus comprising:
a processor;
memory coupled with the processor; and
instructions stored in the memory an operable, when executed by the processor, to cause the apparatus to:
program machine learning algorithm functions;
program artificial intelligent (AI) functions;
enable the automating of extracting, processing, and storing using the machine learning algorithm functions and artificial intelligent (AI) functions;
extract unique iris-biometrics traits of registered users at databases accessible for authenticating the automated iris-biometrics-login every time users are registering to unlock and log on to mobile devices, and public machines including automated teller machine (ATM) locked by downloaded Automated Iris-biometrics-login Identification System (AIIS) software application;
process the unique iris-biometrics traits of registered users at databases accessible for authenticating the automated iris-biometrics-login every time users are registering to unlock and log on to mobile devices, and public machines including automated teller machine (ATM) machines locked by downloaded Automated Iris-biometrics-login Identification System (AIIS) software application;
store the extracted and processed unique iris-biometrics traits of registered users at databases accessible for authenticating the automated iris-biometrics-login every time users are registering to unlock and log on to mobile devices, and public machines including automated teller machine (ATM) machines locked by downloaded Automated Iris-biometrics-login Identification System (AIIS) software application;
authenticate the automated iris-biometrics-login every time users are registering for logging onto websites supporting automated iris-biometrics login in lieu of passwords used for logins using the extracted and processed unique iris-biometrics traits of registered users at databases accessible for authenticating automated iris-biometrics-login every time users are registering to unlock and log on to mobile devices, and public machines including automated teller machine (ATM) machines locked by downloaded Automated Iris-biometrics-login Identification System (AIIS) software application; and
enable the automating of Global Single-Sign-On (G-SSO) Machine-to-Machine (M2M) communication and eliminating the need to use multiple passwords logins whenever accessing multiple websites requiring login authentication using the extracted and processed unique iris-biometrics traits of registered users at databases accessible for authenticating the automated iris-biometrics-login every time users are registering to unlock and log on to mobile devices, and public machines including automated teller machine (ATM) machines locked by downloaded Automated Iris-biometrics-login Identification System (AIIS) software application.

* * * * *